US011988040B2

(12) United States Patent
Dahlgren et al.

(10) Patent No.: US 11,988,040 B2
(45) Date of Patent: May 21, 2024

(54) SYSTEM AND METHOD FOR REDUCING FRICTION IN A COUNTERBALANCING SPRING OF A ROLLER SHADE

(71) Applicant: Crestron Electronics, Inc., Rockleigh, NJ (US)

(72) Inventors: Bruce Ryan Dahlgren, Jackson Heights, NY (US); Michael Campagna, Woodcliff Lake, NJ (US)

(73) Assignee: Crestron Electronics, Inc., Rockleigh, NJ (US)

(*) Notice: Subject to any disclaimer, the term of this patent is extended or adjusted under 35 U.S.C. 154(b) by 827 days.

(21) Appl. No.: 16/881,839

(22) Filed: May 22, 2020

(65) Prior Publication Data

US 2020/0284093 A1 Sep. 10, 2020

Related U.S. Application Data

(63) Continuation-in-part of application No. 16/855,694, filed on Apr. 22, 2020, now Pat. No. 11,613,926, which is a continuation-in-part of application No. 15/872,467, filed on Jan. 16, 2018, now Pat. No. 10,738,530.

(51) Int. Cl.
*E06B 9/62* (2006.01)
*E06B 9/42* (2006.01)
*E06B 9/72* (2006.01)

(52) U.S. Cl.
CPC .................. *E06B 9/72* (2013.01); *E06B 9/42* (2013.01); *E06B 9/62* (2013.01); *E06B 2009/725* (2013.01)

(58) Field of Classification Search
CPC ........ E06B 9/72; E06B 9/62; E06B 2009/725; E06B 9/68; E06B 9/60
See application file for complete search history.

(56) References Cited

U.S. PATENT DOCUMENTS

| | | | | |
|---|---|---|---|---|
| 5,632,063 | A * | 5/1997 | Carper | F16F 1/14 16/DIG. 7 |
| 6,327,744 | B1 * | 12/2001 | Dorma | E06B 9/60 16/197 |
| 8,776,861 | B2 * | 7/2014 | Bohlen | E06B 9/62 160/310 |
| 9,631,425 | B2 * | 4/2017 | Campagna | E06B 9/72 |
| 9,834,986 | B2 * | 12/2017 | Bohlen | E06B 9/62 |
| 11,230,884 | B2 * | 1/2022 | Brondex | E06B 9/60 |
| 11,306,535 | B2 * | 4/2022 | Lu | E06B 9/56 |
| 11,555,349 | B2 * | 1/2023 | Lagarde | E06B 9/72 |

(Continued)

FOREIGN PATENT DOCUMENTS

| | | | | |
|---|---|---|---|---|
| FR | 2934006 A1 * | 1/2010 | | E06B 9/72 |
| WO | WO-2014062504 A1 * | 4/2014 | | E06B 9/42 |

*Primary Examiner* — Abe Massad
*Assistant Examiner* — Jeremy C Ramsey
(74) *Attorney, Agent, or Firm* — Crestron Electronics, Inc.

(57) ABSTRACT

A roller shade comprising a shade drive unit having a counterbalancing spring connected to and extending between a stationary spring carrier and a rotating spring carrier over an output mandrel, wherein the output mandrel comprises a length that maintains the spring in a stretched state such that the plurality of coils at the active portion of the spring do not contact each other when the shade material is at the rolled down position to reduce friction in the counterbalancing spring.

17 Claims, 9 Drawing Sheets

(56) References Cited

U.S. PATENT DOCUMENTS

| | | | | |
|---|---|---|---|---|
| 2005/0087642 | A1* | 4/2005 | Dalle Nogare | E06B 9/90<br>242/385.1 |
| 2010/0269988 | A1* | 10/2010 | Mullet | E06B 9/72<br>160/310 |
| 2013/0099714 | A1* | 4/2013 | Mullet | E06B 9/68<br>318/468 |
| 2021/0087880 | A1* | 3/2021 | Taubenrauch | E06B 9/42 |

* cited by examiner

SYSTEM AND METHOD FOR REDUCING FRICTION IN A COUNTERBALANCING SPRING OF A ROLLER SHADE

BACKGROUND OF THE INVENTION

Technical Field

Aspects of the embodiments generally relate to roller shades, and more particularly to systems, methods, and modes for attachment of a counterbalancing spring to a shade drive unit of a roller shade in a manner that reduces friction in the counterbalancing spring.

Background Art

Motorized roller shades provide a convenient one-touch control solution for screening windows, doors, or the like, to achieve privacy and thermal effects. A motorized roller shade typically includes a rectangular shade material attached at one end to a cylindrical rotating tube, called a roller tube, and at an opposite end to a hem bar. The shade material is wrapped around the roller tube. An electric motor, either mounted inside the roller tube or externally coupled to the roller tube, rotates the roller tube to unravel the shade material to cover a window. To uncover the window, however, a lot of torque and motor power are required to initially lift the entire weight of the shade material and the hem bar. This is in particular detrimental to battery operated motors as rolling up the shade quickly drains the battery.

Various methods exist for counterbalancing roller shades using springs mounted inside the roller tubes in an effort to reduce torque requirements on shade motors. As the roller shade is unraveled, tension builds up in the spring. The tension is released when the roller shade is rolled up, thereby assisting the motor in lifting the shade material. One approach uses a conventional torsion spring comprising a plurality of coils. As a torsion spring is wound up, it builds up torque. When the torsion spring is let go, the amount of torque exerted by the torsion spring progressively reduces in a linear fashion as the torsion spring winds down. FIG. 1A shows a diagram 100 representing the performance of a conventional torsion spring in assisting rolling up an exemplary sized roller shade. Line 105 represents the torque profile necessary to roll up an exemplary sized roller shade from a rolled down position, when the shade material is fully unraveled, up to a rolled up position, when the shade material is fully wrapped about the roller tube. Initially, more torque is required to lift the entire weight of the fully unraveled shade material and the hem bar as represented by maximum torque ($T_{max}$) value 102. As the roller tube turns, the shade material wraps around the roller tube, resulting in less shade material hanging from the roller tube. Accordingly, as the roller tube keeps turning, less torque is required to lift the weight of the remaining shade material until a minimum torque ($T_{min}$) value 103 is reached. Line 106 represents the torque exerted by the torsion spring during the roller shade travel. As shown, the torsion spring torque 106 decreases at a slope in a linear fashion to a zero value as the torsion spring winds down.

Currently, a torsion spring is chosen with a torque 106 that approaches the $T_{max}$ value 102 required to lift the shade material and the hem bar. The resulting torque, shown by line 108 in the figure, required to be exerted by the motor to roll up the roller shade is equal to the difference between the torque of the roller shade 105 and the spring torque 106. FIG. 1B shows a diagram 101 representing the resulting power 110 required of the motor to roll up the shade. As the roller shade begins to roll up from a fully unrolled position, the torsion spring releases its built up torsion energy. Then its energy progressively diminishes as the roller shade continues to roll up. At the end of the rolling up cycle, the torsion spring unravels back to zero torsion assistance. Thus, a conventional torsion spring assists the motor significantly more when the roller shade begins to roll up than during the remainder of the rolling up cycle. In the example of FIGS. 1A and 1B, initially about 0.1 N m of torque and less than 1 W of power are required to lift up the roller shade. That number climbs up to above 0.8 N m of torque and above 6 W of power at the end of the roll up cycle. Thus, while the conventional torsion spring decreases the amount of torque required to roll up the roller shade in the beginning, the amount of torque and power required to finish rolling up the roller shade remains quiet high. In order to further assist in reducing torque in rolling up the roller shade, the counterbalancing spring may be pretensioned in the factory or during installation of the roller shade.

During operation, however, a torsion spring may introduce frictional forces that interferes with its counterbalancing efficiency, which are further exacerbated when the spring is pretensioned. During winding of the spring, the coils get tighter and the spring longitudinally extends causing friction to be formed at the point of contact between the torsion spring coils when winding and unwinding the spring. This friction is increased as the spring continues to be wound (i.e., when lowering the shade material) and is reduced during unwinding of the spring (i.e., when lifting the shade material). However, in pretensioned springs where the spring does not return to a relaxed state, this friction remains to be present. Friction is also increased in a close wound springs, which are preferred in roller shade due to space restrictions. Additionally, friction is further built between typical roller shade system components that allow for axial translation of the torsion spring within the roller tube of the roller shade, which further intensifies the coil friction in the spring.

Therefore, a need has arisen for systems, methods, and modes for counterbalancing a roller shade with pretensioned spring and for attachment of the counterbalancing spring to a shade drive unit of the roller shade in a manner that reduces friction in the counterbalancing spring.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for counterbalancing a roller shade with pretensioned spring and for attachment of the counterbalancing spring to a shade drive unit of the roller shade in a manner to reduce friction in the counterbalancing spring.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiment a roller shade is provided comprising a roller tube, a shade material attached to the roller tube, and a shade drive unit at least partially disposed within the roller tube and comprising a drive assembly adapted to rotate the roller tube to lower or raise the shade material between a rolled up position and a rolled down position. The shade drive unit comprises a stationary spring carrier, a rotating spring carrier operably connected to the roller tube, a counterbalancing spring connected to and longitudinally extending between the stationary spring carrier and the rotating spring carrier, and an output mandrel comprising a first end operably connected to the drive assembly and a second end attached to the rotating spring carrier. The spring comprises an active portion having a plurality of coils located between the stationary spring carrier and the rotating spring carrier. The output mandrel extends within the spring between the stationary spring carrier and the rotating spring carrier and comprises a length that maintains the spring in a stretched state such that the plurality of coils at the active portion of the spring do not contact each other when the shade material is at the rolled down position.

According to an embodiment, at the rolled down position the spring is at a maximum tension, and the length of the output mandrel between the stationary spring carrier and the rotating spring carrier equals to or is larger than a deflected length of the active portion of the spring at the maximum tension. According to an embodiment, the deflected length of the active portion of the spring at the maximum tension is a factor of a diameter of a wire of the spring, a number of coils at the active portion of the spring, and a number of turns between the rolled up position and the rolled down position. According to an embodiment, the length of the output mandrel is determined using the following formula:

$$l_{mandrel}=l_{deflected}+l_{clearance}+l_{components}$$

where, $l_{mandrel}$ is the length the output mandrel, $l_{deflected}$ is the deflected length of the active portion of the spring at the maximum tension, $l_{clearance}$ is a predetermined clearance factor, and $l_{components}$ is an adjustment factor that accounts for assembly of the shade drive unit.

According to a further embodiment, the deflected length of the active portion of the spring at the maximum tension is determined using the following formula:

$$l_{deflected}=d_{wire}((N_{coils}-N_{fastened}\times 2)+N_{turns}+1)$$

where, $d_{wire}$ is a diameter of a wire of the spring, $N_{coils}$ is a total number of coils of the spring, $N_{fastened}$ is a number of coils at each end of the spring that are attached to one of the stationary and the rotating spring carriers, $N_{turns}$ is a number of turns between the rolled up position and the rolled down position.

According to an embodiment, the spring is pretensioned when the shade material is at the rolled up position, and wherein the deflected length of the active portion of the spring at the maximum tension is a factor of a diameter of a wire of the spring, a number of coils at the active portion of the spring, a number of turns between the rolled up position and the rolled down position, and a number of pretension turns in the spring at the rolled up position. According to a further embodiment, the spring is pretensioned when the shade material is at the rolled up position, and wherein the deflected length of the active portion of the spring at the maximum tension is determined using the following formula:

$$l_{deflected}=d_{wire}((N_{coils}-N_{fastened}\times 2)+N_{turns}+N_{pretension}+1)$$

where, $d_{wire}$ is a diameter of a wire of the spring, $N_{coils}$ is a total number of coils of the spring, $N_{fastened}$ is a number of coils at each end of the spring that are attached to one of the stationary and the rotating spring carriers, $N_{turns}$ is a number of turns between the rolled up position and the rolled down position, and $N_{pretension}$ is a number of pretensioned turns in the spring at the rolled up position.

According to an embodiment, the drive assembly comprises a motor adapted to drive a motor output shaft operably connected to the output mandrel. According to another embodiment, the shade drive unit comprises a motor housing adapted to house the motor therein and comprising the stationary spring carrier, wherein the output mandrel extends from an opening in the motor housing, and wherein during operation of the motor rotation of the motor output shaft causes rotation of the rotating spring carrier and thereby the roller tube while the motor housing and the motor remain stationary. According to an embodiment, the drive assembly further comprises at least one selected from the group consisting of a planetary gear, a clutch, or any combinations thereof. According to another embodiment, the output mandrel comprises a first mandrel portion connected to a second mandrel portion, wherein the first mandrel portion is operably connected to the drive assembly and wherein the second mandrel portion is attached to the rotating spring carrier.

According to yet another embodiment, wherein during assembly of the shade drive unit: the spring is adapted to be positioned over the output mandrel and be attached at a first end of spring to the stationary spring carrier, the rotating spring carrier is adapted to be slidably mounted over the output mandrel to allow a second end of the spring to be attached to the rotating spring carrier while the spring is in an unstretched state, and the rotating spring carrier is adapted to be slidably pulled away from the stationary spring carrier to stretch the spring to the stretched state and be attached to the second end of the output mandrel.

According to an embodiment, the shade drive unit comprises a drive wheel having a cylindrical body operably connected to the roller tube that extends from a first end to a second end, wherein the rotating spring carrier extends from the first end of the cylindrical body, and the second end of the cylindrical body is adapted to retain a washer, wherein the washer is adapted to be attached to the second end of the output mandrel to maintain the spring in the stretched state. According to a further embodiment, the drive wheel comprises a bore that traversely extends through the cylindrical body and the rotating spring carrier, wherein the bore is shaped to mate with an external surface of the output mandrel such that rotation of the output mandrel causes rotation of the drive wheel. According to a further embodiment, the cylindrical body of the drive wheel comprises a washer receiving cavity recessed into the second end of the cylindrical body that is defined by an opening at the second end of the cylindrical body and a biasing surface within the cylindrical body of the drive wheel, wherein the washer is adapted to be retained within the washer receiving cavity and biased against the biasing surface. According to yet another embodiment, the washer comprises locking arms and wherein the opening in the cylindrical body comprises circumferentially and inwardly extending washer retaining arms adapted to engage the locking arms of the washer. According to a further embodiment, the washer is adapted to be inserted through the opening in the second end of the cylindrical body by aligning the locking arms of the washer with a space between the retaining arms of the cylindrical body of the drive wheel and inserting the washer into the washer receiving cavity, wherein the washer is adapted to be retained within the washer receiving cavity by turning the washer until the locking arms of the washer engage the retaining arms of the drive wheel. According to another embodiment, the washer is secured to the output mandrel via a screw adapted to be inserting through a hole in the washer and screwed into a threaded hole in the second end of the output mandrel.

According to another aspect of the embodiments, a roller shade is provided comprising a roller tube, a shade material attached to the roller tube, and a shade drive unit at least partially disposed within the roller tube and adapted to rotate the roller tube to lower or raise the shade material from a rolled up position to a rolled down position. The shade drive unit comprises a motor adapted to drive a motor output shaft, a motor housing adapted to house the motor therein and comprising a first spring carrier, an output mandrel comprising a first end operably connected to the motor output shaft and a second end that extends out of an opening in the motor housing, a drive wheel attached to the second end of the output mandrel and comprising a second spring carrier, wherein the drive wheel is operably connected to the roller tube, and a counterbalancing spring longitudinally extending from a first end to a second end and comprising a plurality of coils, wherein the first end of the counterbalancing spring is connected to the first spring carrier and the second end of the counterbalancing spring is connected to the second spring carrier, wherein the output mandrel extends within the counterbalancing spring. The output mandrel comprises a length that maintains the spring in a stretched state such that the plurality of coils of the spring located between the first and second spring carriers do not touch when the shade material is at the rolled down position.

According to another aspect of the embodiments, a roller shade is provided comprising a roller tube, a shade material attached to the roller tube, and a shade drive unit at least partially disposed within the roller tube and comprising a drive assembly adapted to rotate the roller tube to lower or raise the shade material between a rolled up position and a rolled down position. The shade drive unit comprises a stationary spring carrier, a rotating spring carrier operably connected to the roller tube, a counterbalancing spring connected to and longitudinally extending between the stationary spring carrier and the rotating spring carrier, and an output mandrel comprising a first end operably connected to the drive assembly and a second end attached to the rotating spring carrier. The spring comprises an active portion having a plurality of coils located between the stationary spring carrier and the rotating spring carrier, wherein at the rolled down position the spring is at a maximum tension. The output mandrel extends within the spring between the stationary spring carrier and the rotating spring carrier, wherein a length of the output mandrel between the stationary spring carrier and the rotating spring carrier equals to or is larger than a deflected length of the active portion of the spring at the maximum tension.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1A:
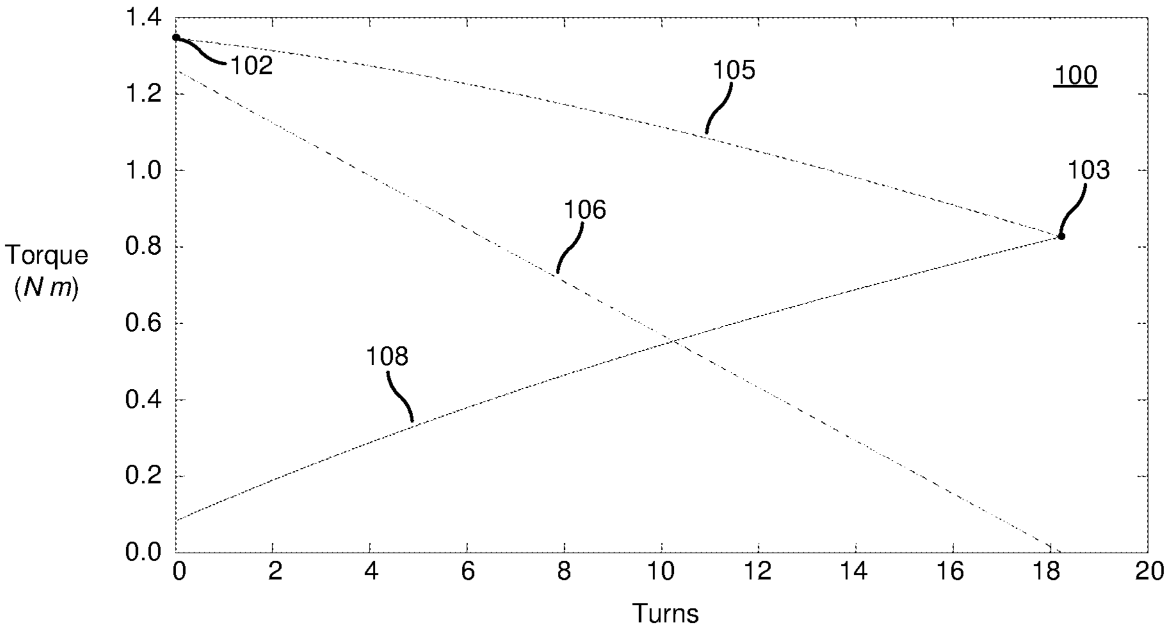
FIG. 1A (Prior Art)

FIG. 1A illustrates a torque diagram of a prior-art roller shade using a conventional torsion spring.

Figure 1B:
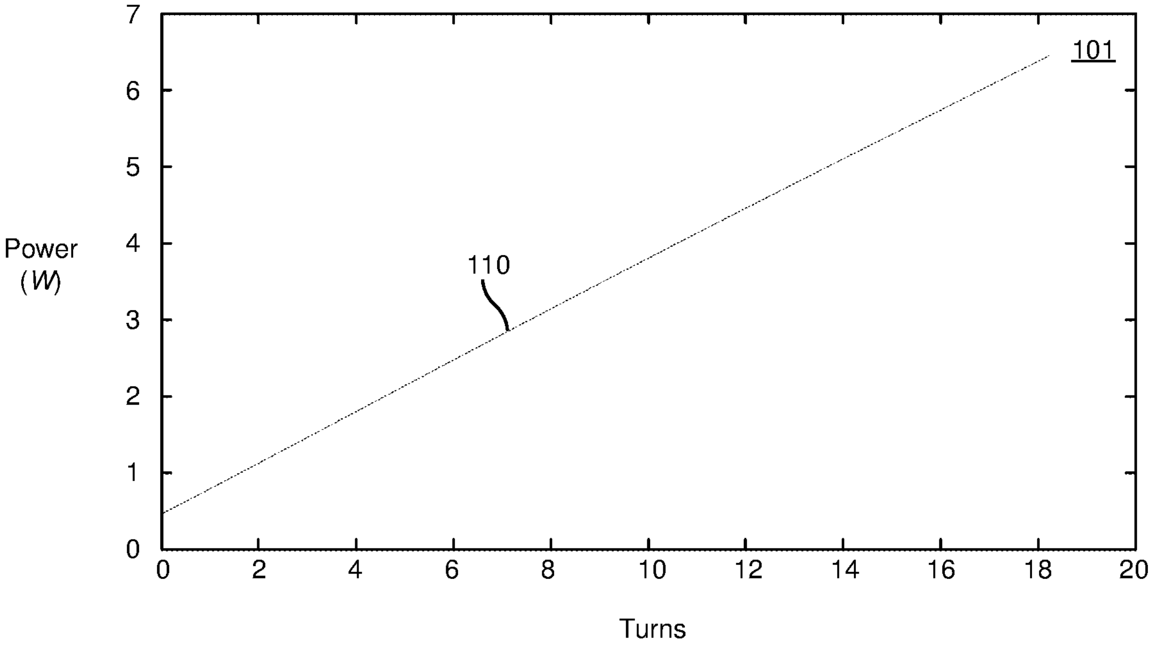
FIG. 1B (Prior Art)

FIG. 1B illustrates a power diagram of a motor required to lift the prior-art roller shade using the conventional torsion spring.

Figure 2A:
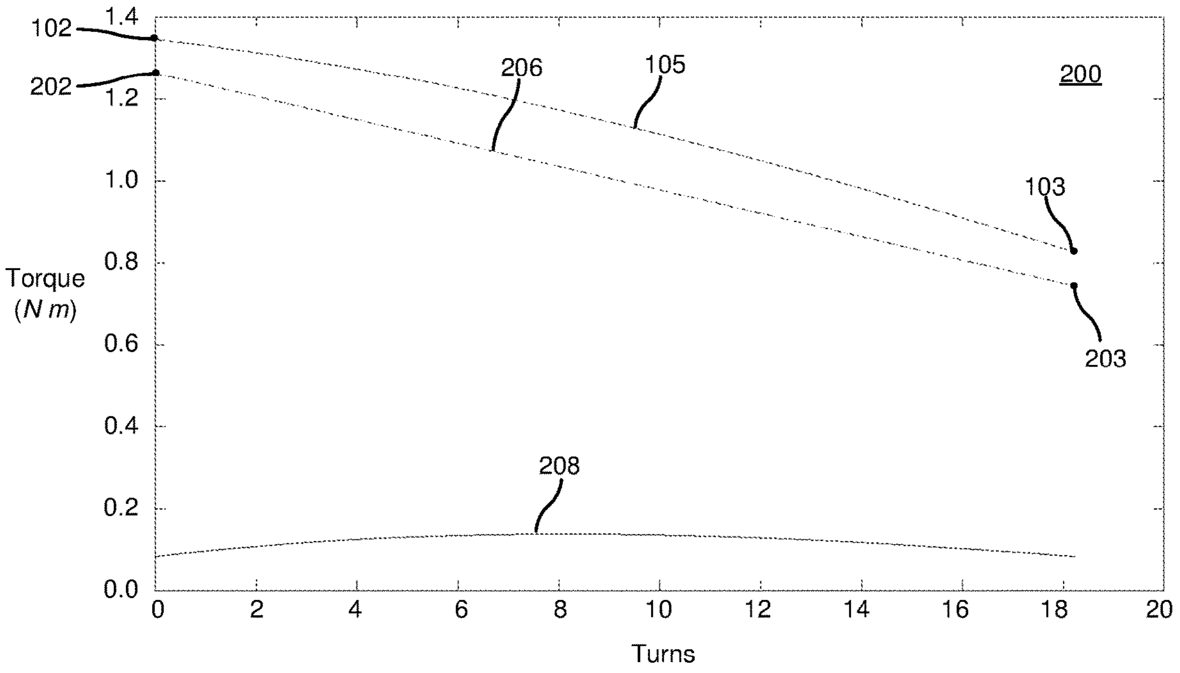

FIG. 2A illustrates a torque diagram of a roller shade using a pretensioned torsion spring according to one aspect of the embodiments.

Figure 2B:
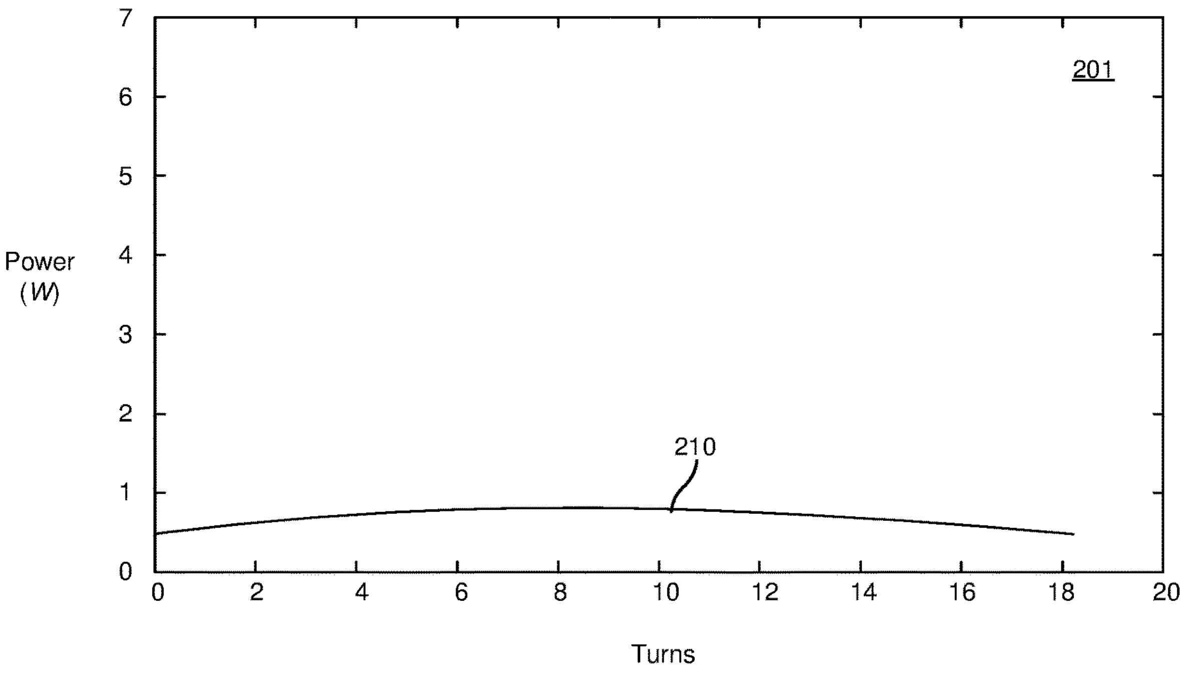

FIG. 2B illustrates a power diagram of a motor required to lift the roller shade using the pretensioned torsion spring according to one aspect of the embodiments.

Figure 3A:
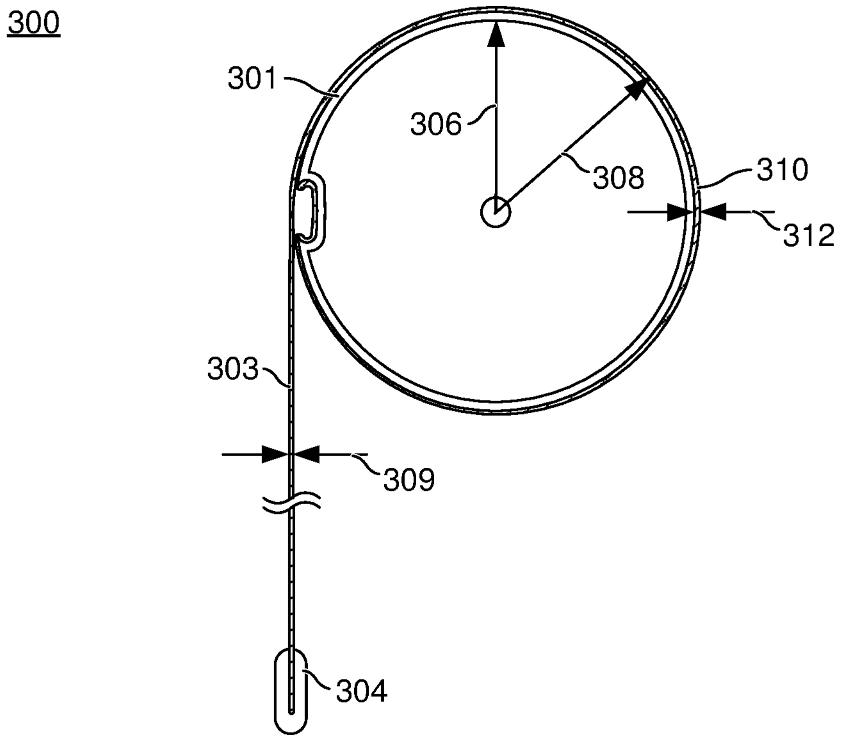

FIG. 3A illustrates an end view of a roller shade in a fully rolled down position according to one aspect of the embodiments.

Figure 3B:
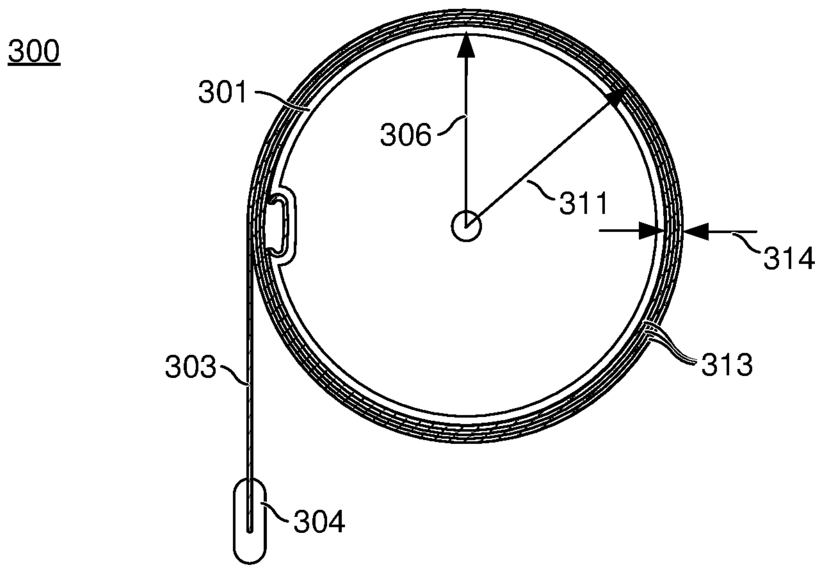

FIG. 3B illustrates an end view of the roller shade in a fully rolled up position according to one aspect of the embodiments.

Figure 4:
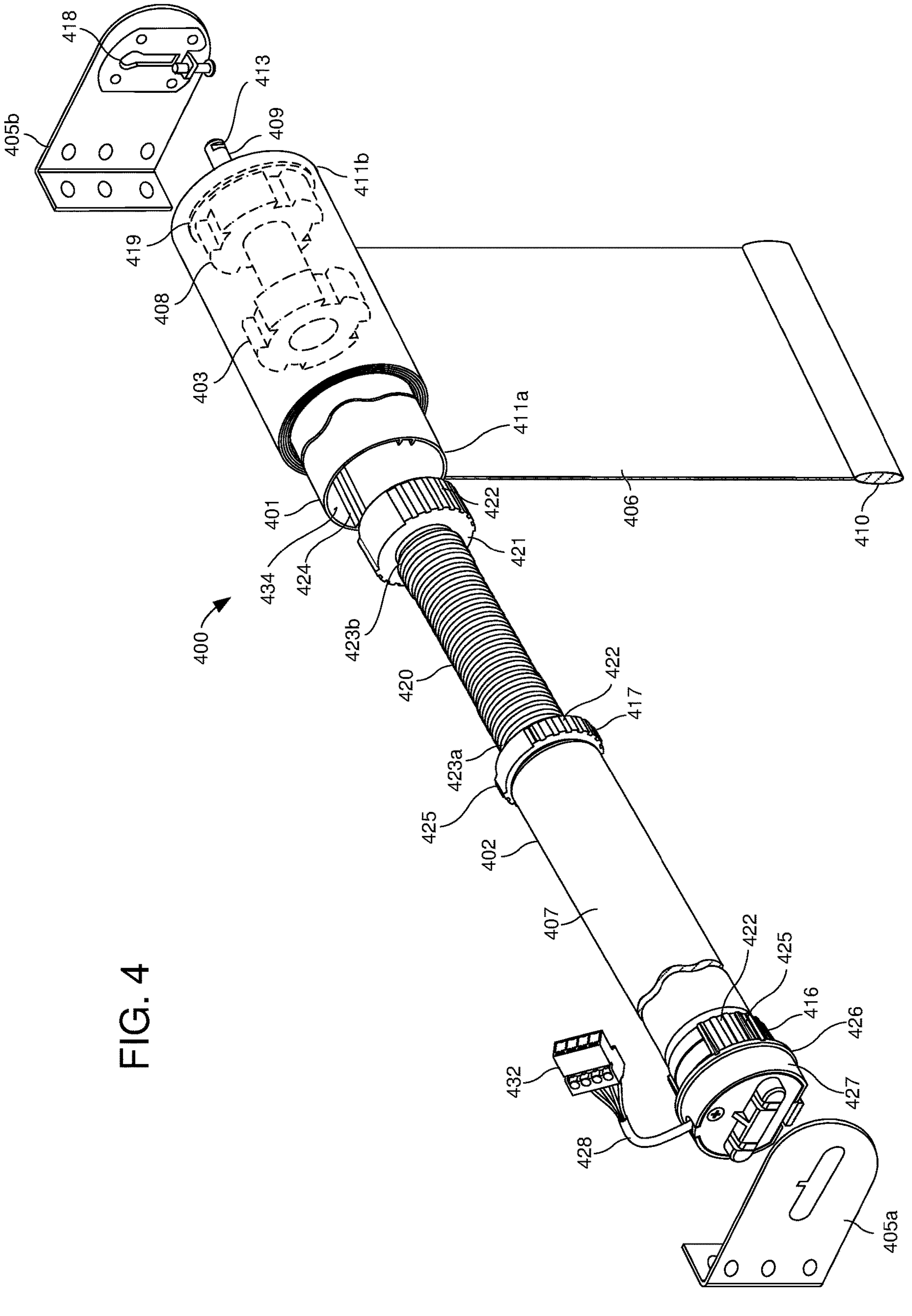

FIG. 4 illustrates a partially exploded perspective view of a roller shade according to one aspect of the embodiments.

Figure 5:
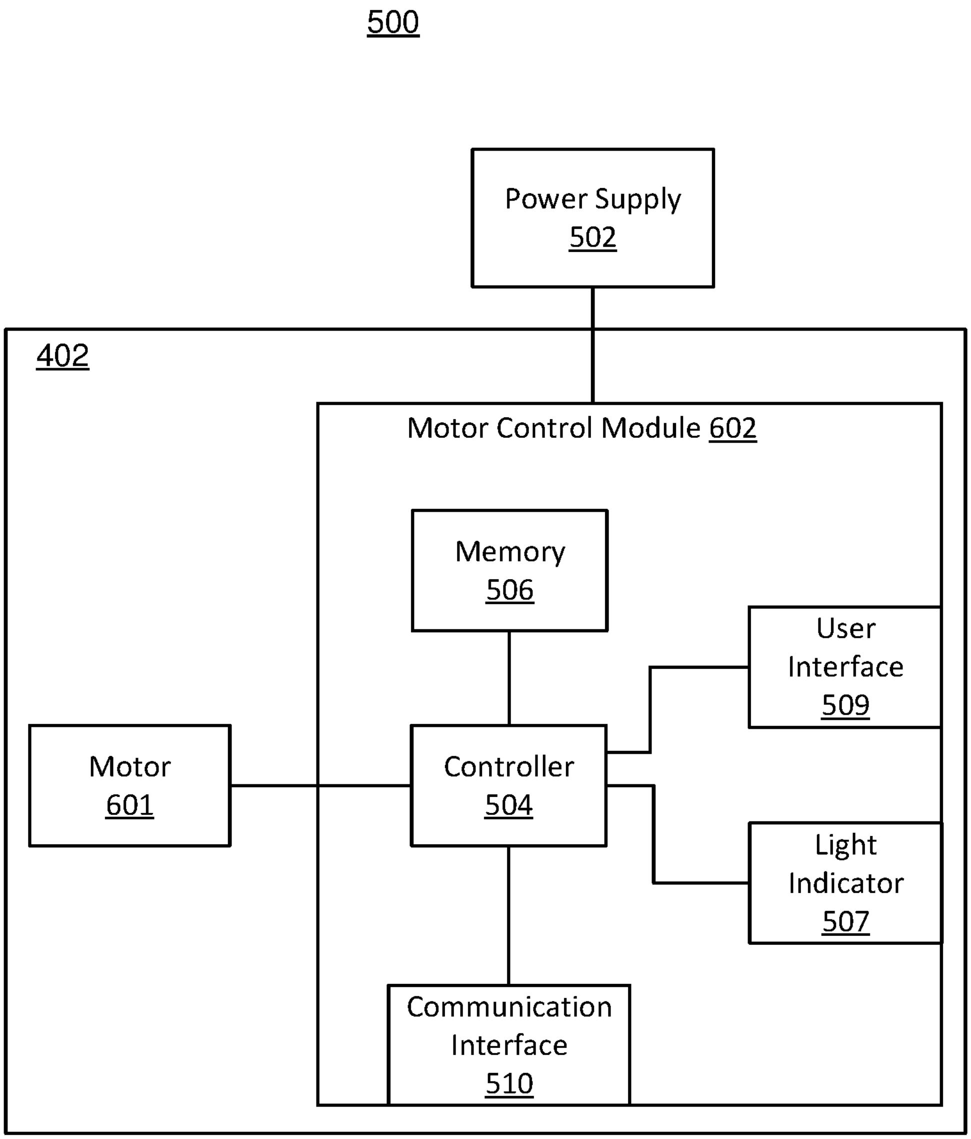

FIG. 5 shows an illustrative block diagram of a shade drive unit according to one aspect of the embodiments.

Figure 6:
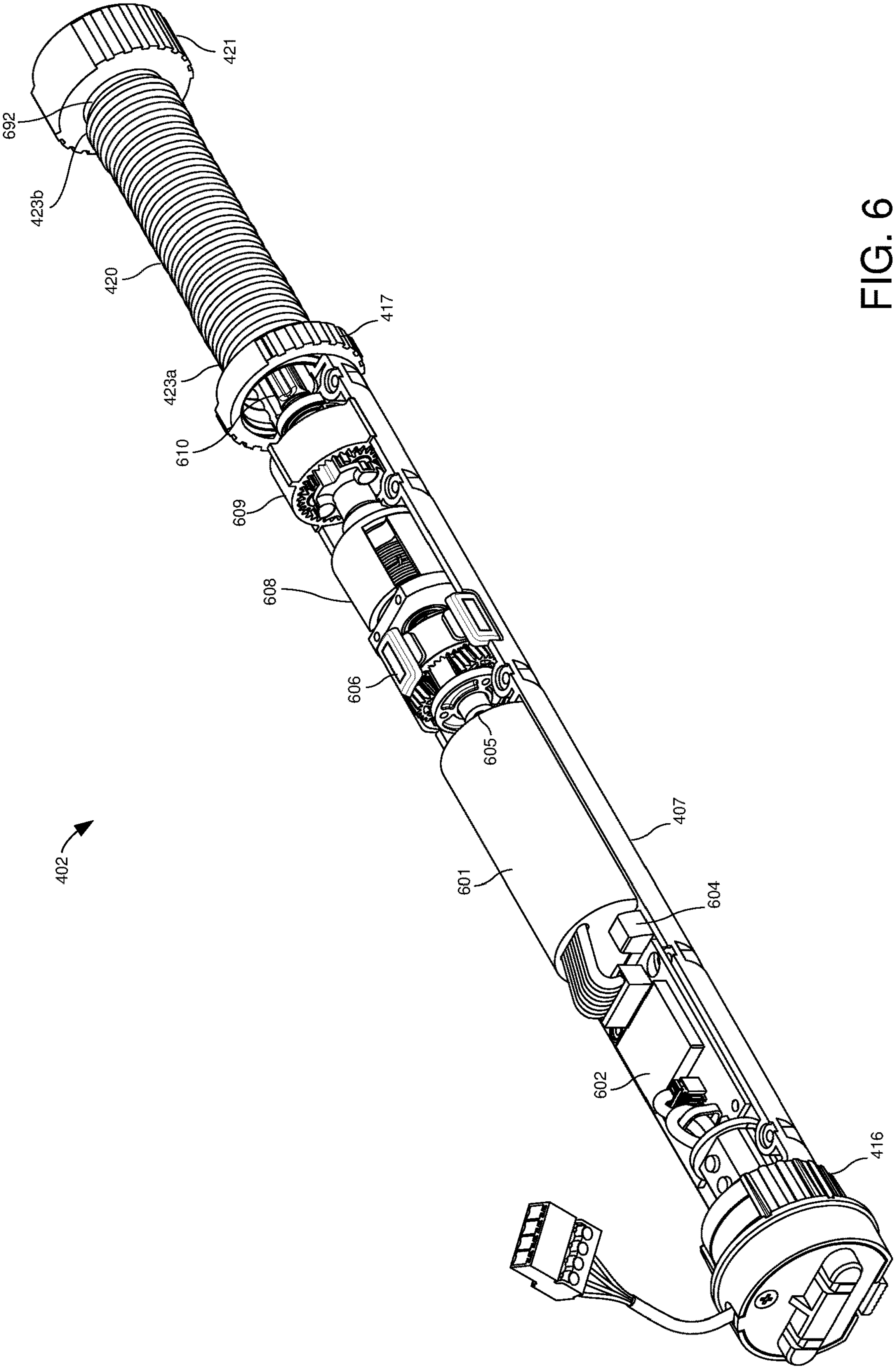

FIG. 6 shows a first side perspective view of the shade drive unit according to one aspect of the embodiments.

Figure 7:
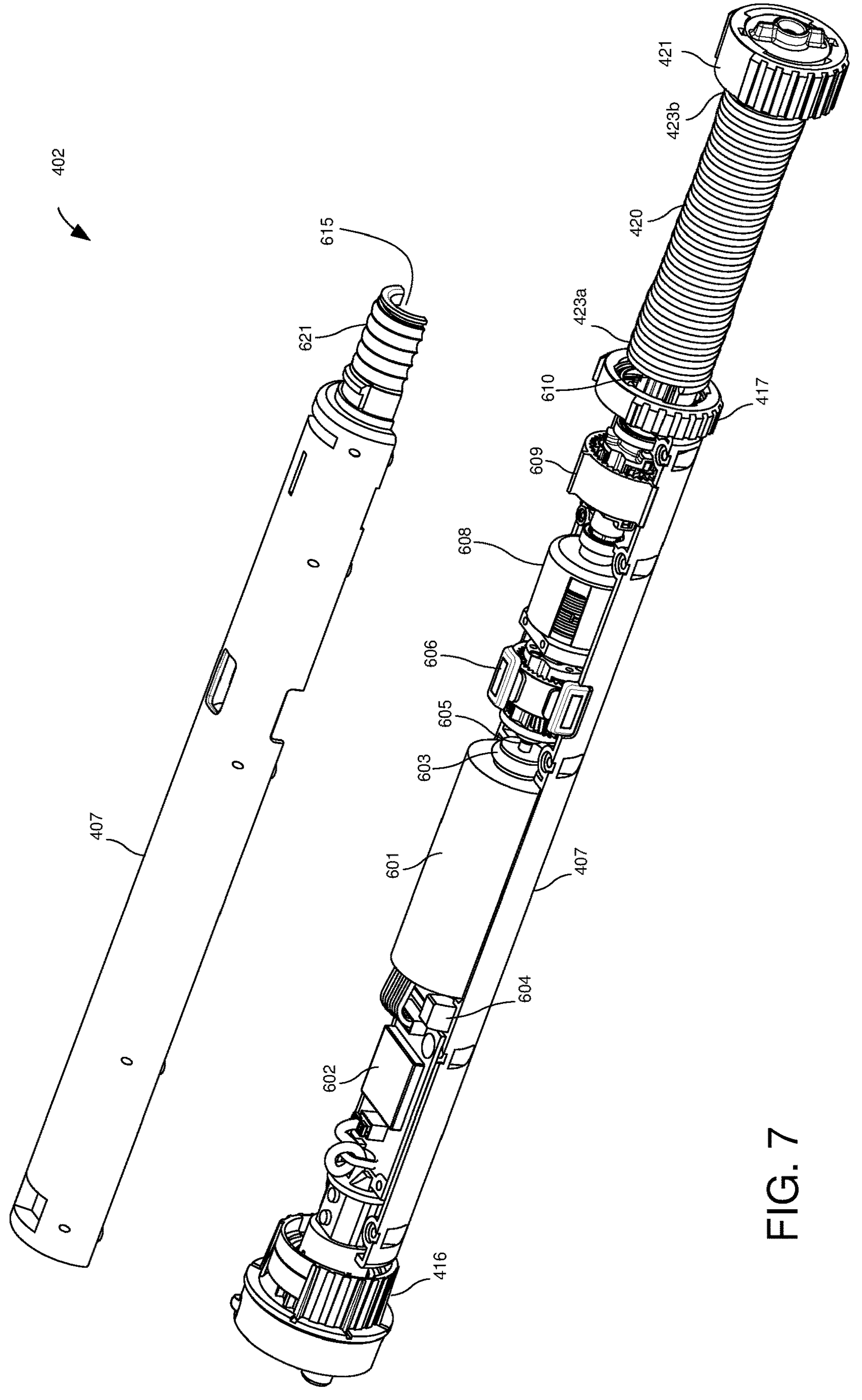

FIG. 7 shows a second side perspective view of the shade drive unit according to one aspect of the embodiments.

Figure 8:
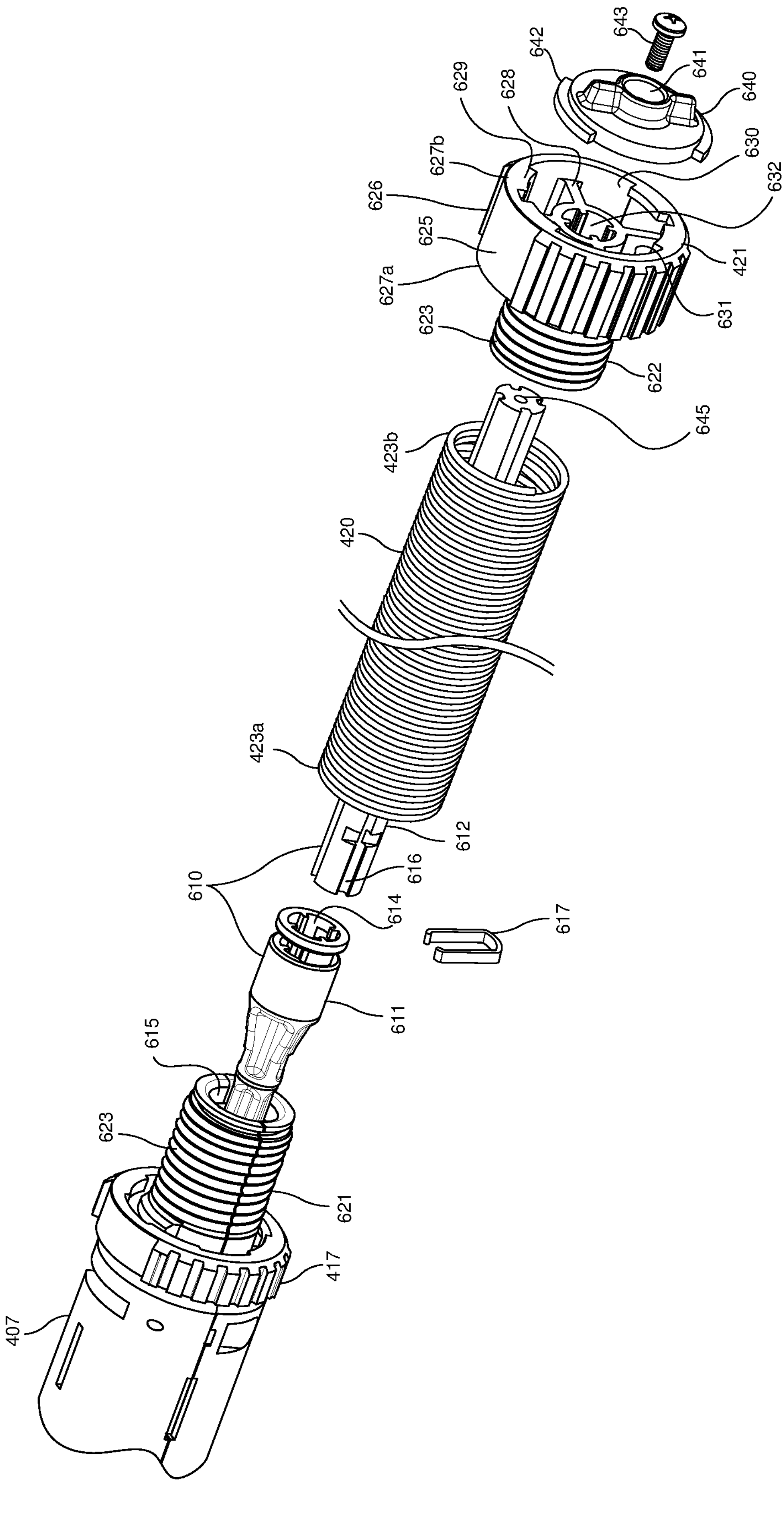

FIG. 8 shows an exploded perspective view of a portion of the shade drive unit according to one aspect of the embodiments.

Figure 9:
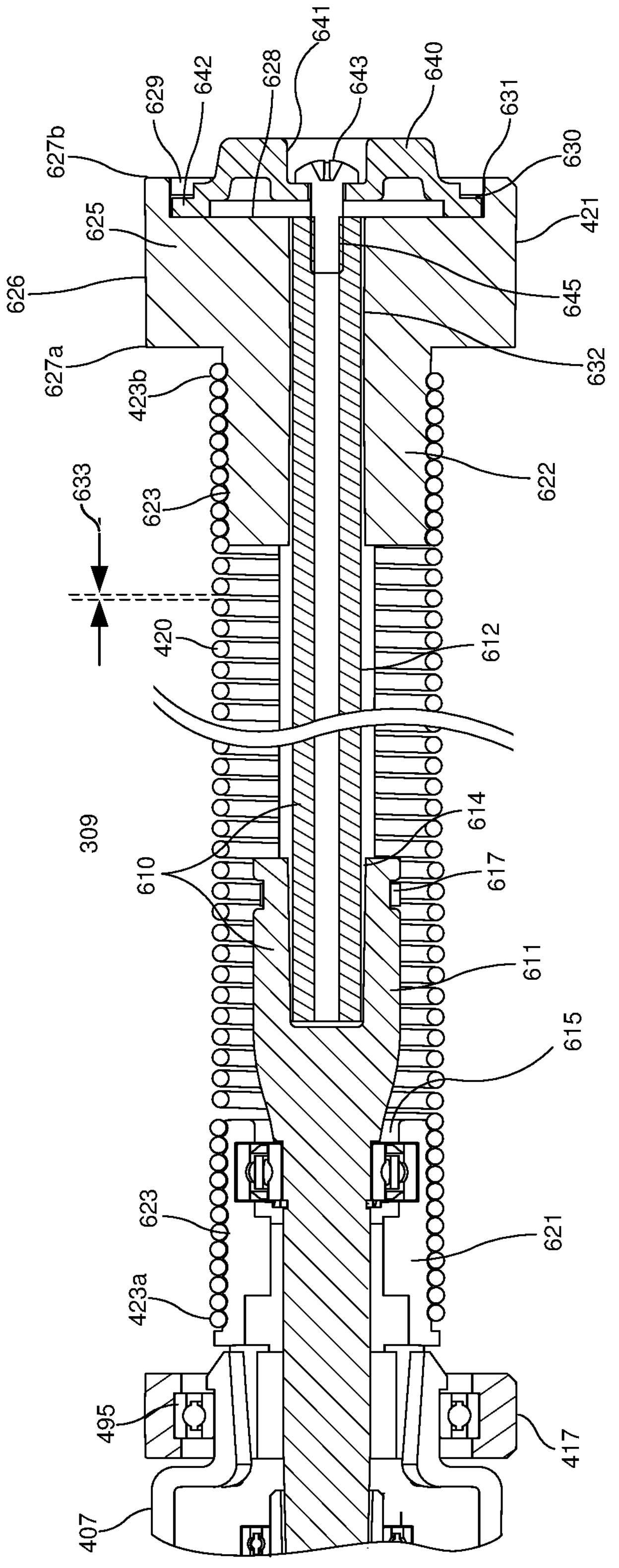

FIG. 9 shows a cross-sectional view of the portion of the shade drive unit according to one aspect of the embodiments.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims.

Reference throughout the specification to “one embodiment” or “an embodiment” means that a particular feature, structure, or characteristic described in connection with an embodiment is included in at least one embodiment of the embodiments. Thus, the appearance of the phrases “in one embodiment” or “in an embodiment” in various places throughout the specification is not necessarily referring to the same embodiment. Further, the particular features, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

100 Torque Diagram of a Roller Shade Using a Conventional Torsion Spring
101 Power Diagram of a Motor
102 Maximum Torque
103 Minimum Torque
105 Torque Profile of a Roller Shade
106 Torque of a Conventional Torsion Spring
108 Torque of a Motor
110 Power of a Motor
200 Torque Diagram of a Roller Shade Using a Pretensioned Torsion Spring
202 Maximum Torque
203 Minimum Torque
206 Torque Profile of Roller Shade’s Spring
208 Torque of a Motor
210 Power of a Motor
300 Roller Shade
301 Roller Tube
303 Shade Material
304 Hem Bar
306 Radius of the Roller Tube
308 Radius of the Roller Tube plus the Thickness of the Shade Material Layers Wrapped over the Roller Tube (if any) when the Shade Material is at the Rolled Down Position
309 Thickness of the Shade Material (Single Layer)
310 Overwrap
311 Radius of the Roller Tube plus the Thickness of the Shade Material Layers Wrapped over the Roller Tube when the Shade Material is at the Rolled Up Position
312 Thickness of the Shade Material Layers over the Roller Tube
313 Shade Material Layers
314 Thickness of the Shade Material Layers over the Roller Tube
400 Roller Shade
401 Roller Tube
402 Shade drive unit
403 Idler Assembly
**405*a*** Mounting Bracket
**405*b*** Mounting Bracket
406 Shade Material
407 Motor Housing
408 Idler Body
409 Idler Pin
410 Hem Bar
**411*a*** First End of Roller Tube
**411*b*** Second End of Roller Tube
413 Pin Tip
416 Crown Adapter Wheel
417 Idler Crown Wheel
418 Keyhole
419 Flange
420 Counterbalancing Spring
421 Drive Wheel
422 Channels
**423*a*** First End of Counterbalancing Spring
**423*b*** Second End of Counterbalancing Spring
424 Projections
425 Teeth
426 Flange
427 Motor Head
428 Power Cord
432 Terminal Block
434 Inner Surface
495 Ball Bearings
500 Block Diagram of the Shade drive unit
502 Power Supply
504 Controller
506 Memory
507 Light Indicator
509 User Interface
510 Communication Interface
601 Motor
602 Motor Control Module
603 O-Ring
604 Rubber Locking Strip
605 Motor Output Shaft
606 First Stage Planetary Gear
608 Clutch
609 Final Stage Planetary Gear
610 Output Mandrel
611 First Mandrel Portion
612 Second Mandrel Portion
614 Keyed Bore
615 Motor Housing Opening
616 Keyed Grooves
617 Retaining Clip
621 First Spring Carrier
622 Second Spring Carrier
623 Threads
625 Cylindrical Body
626 Outer Surface
**627*a*** First End
**627*b*** Second End
628 Washer Biasing Surface
629 Washer Retaining Arms
630 Washer Receiving Cavity
631 Opening
632 Keyed Bore
633 Distance
640 Washer
641 Hole
642 Locking Arms
643 Screw
645 Threaded Hole

List of Acronyms Used in the Specification in Alphabetical Order

The following is a list of the acronyms used in the specification in alphabetical order.

ASICs Application Specific Integrated Circuits
BLDC Brushless Direct Current
CAT5 Category 5 Cable
$C_{friction}$ Constant Representing the Friction between the Spring Coils
DC Direct Current
$d_{coils}$ Mean Diameter of the Spring Coils
$d_{wire}$ Diameter of the Spring Wire
E Elastic Modulus
IR Infrared
k Slope of the Torque Profile of the Roller Shade
LAN Local Area Network
LED Light Emitting Diode
$l_{clearance}$ Clearance Factor to Ensure that the Spring Coils do not Touch when the Spring is Fully Tensioned at the Rolled Down Position
$l_{components}$ Adjustment Factor to Account for the Assembly Components of the Shade Drive Unit Assembly
$l_{deflected}$ Deflected Length of the Active Portion of the Spring at Maximum Tension
$l_{mandrel}$ Length the Second Mandrel Portion
$l_{overwrap}$ Length of Shade Material Overwrap
$l_{spring}$ Total Length of the Spring
N m Newton Meter
$N_{coils}$ Total Number of Coils in the Spring
$N_{fastened}$ Number of Nonactive Fastened Coils
$N_{pretension}$ Number of Pretensioned Turns
$N_{turns}$ Number of Turns Between Rolled Up and Rolled Down Position
PoE Power Over Ethernet
RAM Random-Access Memory
RF Radio Frequency
ROM Read-Only Memory
$r_{down}$ Radius of the Roller Tube Plus the Thickness of the Shade Material Layers over the Roller Tube (if any) When the Shade Material is at the Rolled Down Position
$r_{tube}$ Radius of the Roller Tube
$r_{up}$ Radius of the Roller Tube Plus the Thickness of the Shade Material Layers over the Roller Tube When the Shade Material is at the Rolled Up Position
$T_{max}$ Maximum Torque
$t_{material}$ Thickness of the Shade Material (Single Layer)
$T_{min}$ Minimum Torque
$w_{material}$ Weight of the Shade Material
$w_{hembar}$ Weight of the Hem Bar

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, NJ.

The different aspects of the embodiments described herein pertain to the context of counterbalancing and pretensioning roller shades, but is not limited thereto, except as may be set forth expressly in the appended claims. While the roller shade is described herein for covering a window, the roller shade may be used to cover over types of architectural openings, such as doors, wall openings, or the like. The embodiments described herein may further be adapted in other types of window or door coverings, such as inverted rollers, Roman shades, Austrian shades, pleated shades, blinds, shutters, skylight shades, garage doors, or the like. In addition, the embodiments described herein can be used in shade drive units that comprise a motor to drive the roller shade, as described herein, or they can be implemented in non-motorized window treatments that implement a counterbalancing spring without departing from the scope of the present embodiments.

Disclosed herein are systems, methods, and modes for counterbalancing a roller shade with one or more pretensioned springs, and more particularly for the attachment of the counterbalancing spring and pretensioning the spring to lower the torque load on the motor of the roller shade throughout the rolling up or rolling down cycles of the roller shade. Disclosed are also systems, methods, and modes for a motor pretensioned roller shade that can be pretensioned using the motor to a preset amount and which locks and maintains the pretension.

To efficiently counterbalance a roller shade, a preset number of pretensioning turns first need to be determined for a given roller shade and its spring. In one embodiment, a torsion spring is utilized. However, other types of springs may be used without departing from the scope of current embodiments. Referring to FIG. 2A, line 105 represents the roller shade torque profile across the number of turns required to roll up an exemplary sized roller shade from a rolled down position, when the shade material is fully unraveled, up to a rolled up position, when the shade material is substantially fully wrapped up around the roller tube. The y-axis represents the torque required in Newton Meter (N m) to roll up a roller shade, and the x-axis represents the number of 360 degree turns the roller shade rotates during the rolling up cycle (i.e., traveling right along the x-axis). Initially, more torque is required to start lifting all the weight of the shade material and the hem bar. As the roller tube rotates, the shade material wraps around the roller tube, resulting in less shade material hanging from the roller tube. Accordingly, as the roller tube keeps rotating, less torque is required to lift the weight of the remaining shade material plus the hem bar. $T_{max}$ 102 represents the maximum torque required to start lifting the entire weight of the shade material and hem bar, while $T_{min}$ 103 represents the minimum torque required to finish lifting the shade material and the hem bar during the rolling up cycle.

Line 206 represents the torque profile of the roller shade's spring. It is desired that the $T_{max}$ 202 and $T_{min}$ 203 values of the spring be set to be substantially equal to the $T_{max}$ 102 and $T_{min}$ 103 values, respectively, of the roller shade torque profile 105. Alternatively, as shown in FIG. 2A, the $T_{max}$ 202 and $T_{min}$ 203 values of the spring may be offset down by a predefined amount from the roller shade $T_{max}$ 102 and $T_{min}$ 103 values, respectively. Reducing the $T_{max}$ 202 and $T_{min}$ 203 values of the spring with respect to the roller shade $T_{max}$ 102 and $T_{min}$ 103 values will ensure that the shade material naturally drops down when the roller shade is rolled down and does not tend to roll back up. As shown in FIG. 2A, $T_{min}$ 103 required to finish lifting the roller shade is not zero. There is always some torque required to finish lifting the shade because of the weight of the hem bar across the width of the shade, some pulling created by the shade material, and the inertia and weight of the roller tube itself. Accordingly, $T_{min}$ set point 203 of the spring has to be brought up from zero to substantially equal to, or slightly offset below $T_{min}$ 103 of the roller shade. This is accomplished by pretensioning the torsion spring such that when the roller shade is fully rolled up, the torsion spring still exerts a preset amount of torque 203 that is substantially equal to or slightly offset below from $T_{min}$ 103 of the roller shade.

With optimally pretensioned torsion spring, the spring assists rolling up the roller shade throughout the rolling up cycle of the roller shade. As a result, the resulting torque 208 required to be exerted by the motor to roll up the roller shade is minimal and substantially steady throughout the rolling up cycle of the roller shade. Similarly, the resulting power 210 shown in FIG. 2B is significantly reduced and is substantially steady throughout the rolling up cycle of the roller shade. As illustrated in the example of FIGS. 2A and 2B, the maximum torque required to be exerted to lift an exemplary sized roller shade is below 0.15 N m, compared to above 0.8 N m of torque required to lift the same sized shade by a motor with the aforementioned prior art counterbalancing system. Similarly, the maximum power required to lift an exemplary sized roller shade is around 0.8 W, compared to 6 W of power required to lift the same sized shade by a motor with the aforementioned prior art counterbalancing system.

In addition, the optimally pretensioned torsion spring also assists the motor to steadily lower the roller shade throughout the entire rolling down cycle (i.e., traveling left along x-axis in FIG. 2A).

The torque profile 105 of a roller shade is effected by various properties of the roller shade. For example, the torque profile 105 of a roller shade varies depending on various factors, such as the roller tube diameter and radius, the diameter and radius of the shade material as it wraps about the roller tube, the shade material thickness, the width and length of the shade material, the number of layers of the shade material about the roller tube, the weight of the shade material, and the weight of the hem bar. Therefore, depending on the window size and the fabric selection, the pretension parameters of the required torsion spring will change. The systems, methods, and modes of the embodiments described herein provide a motorized roller shade assembly that can be pretensioned using its integrated motor by an optimal number of pretension turns such that the $T_{min}$ value 203 of the torsion spring corresponds to the $T_{min}$ value 103 of the roller shade.

The embodiments described herein may be used to quickly and precisely pretension torsion springs to be used in customized roller shades, during the assembly of the customized roller shades at the factory, right after the customer has placed their order. The embodiments described herein may be also used to pretension torsion springs for use in stock roller shades sold in a number of predetermined sizes and shade materials. In yet another embodiment, the pretension of the roller shade may be adjusted or corrected, if necessary, in the field by removing the shade drive unit containing the motor from the roller tube, pretensioning the spring, and reinserting the drive unit into the roller tube. In addition, if a defective motor needs to be replaced, the customized pretensioning information of the defective motor may be transmitted to the replacement motor and used to pretension its spring.

According to an embodiment, to determine the preset number of pretension turns, initially the roller shade properties are determined. FIG. 3A illustrates an end view of a roller shade 300 in a fully rolled down position, and FIG. 3B illustrates an end view of the roller shade 300 in a fully rolled up position. The roller shade properties include one or more of the diameter or radius 306 of the roller tube 301, the weight of the shade material 303, the thickness 309 of the shade material 303 (single layer), the width and length of the shade material 303, and the weight of the hem bar 304, among others. For customizable roller shades, for example, initially a customer will measure the window dimensions and select the style of the roller shade they want. The customer may pick from a selection of mounting brackets and hardware, hem bars, fabric designs, fabric attributes, such as transparency, translucency, and blackout materials, and the like. A customer may use the Crestron® Design Tool, a one-stop Web-based platform for all the Crestron® Shading Solutions designing, available from Crestron Electronics, Inc. of Rockleigh, NJ. Then, the customer will submit their order to the manufacturer. The manufacturer may use computer software to convert the customer requirements to manufacturing specifications for production, as is known in the art. The manufacturing specifications specify, for example, the radius 306 of the roller tube 301 to use, how long to cut the roller tube 301, how long and wide to cut the shade material 303, and what type of hardware to use in assembling the customized roller shade, including the type of hem bar 304. All of the above customized properties will drive the weight of the shade material 303 and hem bar 304, and thereby the roller shade torque profile 105.

Using the aforementioned roller shade properties, the $T_{max}$ and $T_{min}$ values of the roller shade 300 are determined. $T_{max}$ represents the maximum torque required to start rolling up the roller shade 300 when the shade material 303 is at the rolled down position and is substantially fully unraveled from the roller tube 301. Thus, as shown in FIG. 3A, the substantially entire weight of the shade material 303 plus the weight of the hem bar 304 need to be pulled up. $T_{max}$ may be determined by the following formula:

$$T_{max}=r_{down}\lambda(w_{material}+w_{hembar}) \quad (1)$$

where,

- $T_{max}$ is the maximum torque required to lift the shade material 303 and hem bar 304,
- $r_{down}$ is the radius 308 of the roller tube 301 plus the thickness 312 of the shade material layers wrapped over the roller tube 301 (if any) when the shade material is at the rolled down position where substantially the entire shade material 303 is unraveled from the roller tube 301,
- $w_{material}$ is the weight of the entire shade material 303, and
- $w_{hembar}$ is the weight of the hem bar 304.

According to one embodiment, in roller shades where the entire shade material 303 is unraveled from the roller tube 301 in the rolled down position, radius ($r_{down}$) 308 equals to the radius ($r_{tube}$) of the roller tube 301. In another embodiment, the roller shade may comprise an overwrap 310 where some length of shade material remains to be wrapped about the roller tube 301 when the shade material 303 is in the rolled down position. Thickness 312 represents the total thickness of the shade material layers that are wrapped over the roller tube 301. Typically, the overwrap 310 will form a single layer of shade material 303 over the roller tube 301 and as such total thickness 312 would equal to thickness 309 of a single layer of shade material 303. However, the overwrap 310 may form more than a single layer, resulting in greater overall thickness 312 of the shade material layers over the roller tube 301. The shade material overwrap 310 may be used to hide the roller tube 301 and/or to eliminate the pull by the shade material on the point of contact between the shade material 303 and the roller tube 301 and prevent disengagement. In such a case, $r_{down}$ is the radius 308 of the roller tube 301 plus the thickness 312 of the shade material layers over the roller tube 301 that remains to be wrapped about the roller tube 301 in the rolled down position to account for the additional shade material overwrap 310. According to an embodiment, radius ($r_{down}$) 308 may be determined using the following formula:

$$r_{down} = \sqrt{\frac{t_{material} \times l_{overwrap}}{\pi} + (r_{rt})^2} \quad (2)$$

where, $r_{down}$ is the radius 308 of the roller tube 301 plus the shade material 303 (if any) at the rolled down position, $t_{material}$ is the thickness of the shade material 303 (single layer), $l_{overwrap}$ is the length of shade material overwrap 310 (if any), and $r_{tube}$ is the radius 306 of the roller tube 301.

While the formulas above and below utilize the radius as the measuring parameter, for example for radius 306, 308, and 311, the formulas herein can instead use the diameter parameter without departing from the scope of the present embodiments.

$T_{min}$ represents the minimum torque required to finish rolling up the roller shade 300 when the shade material 303 is at the rolled up position and is substantially fully wrapped around the roller tube 301. As shown in FIG. 3B, the only weight that is being lifted at the end of the rolling up cycle substantially consists of the weight of the hem bar 304. $T_{min}$ may be determined by the following formula:

$$T_{min} = r_{up} \times w_{hembar} \quad (3)$$

where, $T_{min}$ is the minimum torque required to lift the shade material 303 and hem bar 304, $r_{up}$ is the radius 311 of the roller tube 301 plus the thickness 314 of the shade material layers wrapped over the roller tube 301 when the shade material is at the rolled up position where substantially the entire shade material 301 is wrapped around the roller tube 301, and $w_{hembar}$ is the weight of the hem bar 304.

Total thickness 314 of the shade material layers wrapped over the roller tube 301 represents the thickness 309 of the shade material 303 times the number of layers 313 that are wrapped about the roller tube 301 at the rolled up position. According to an embodiment, radius ($r_{up}$) 311 may be determined using the following formula:

$$r_{up} = \sqrt{\frac{t_{material} \times (l_{material} + l_{overwrap})}{\pi} + (r_{tube})^2} \quad (4)$$

where, $r_{up}$ is the radius of the roller tube 301 plus the shade material 303 at the rolled up position, $t_{material}$ is the thickness 309 of the shade material 303 (single layer), $l_{material}$ is the length of the shade material 303 that hangs from the roller tube 301 during the rolled down position, $l_{overwrap}$ is the length of shade material 303 overwrap 310 (if any), and $r_{tube}$ is the radius 306 of the roller tube 301.

Exemplary $T_{max}$ 102 and $T_{min}$ 103 values are illustrated in FIG. 2A. Using the $T_{min}$ and $T_{max}$ values, a slope is determined for the rate of change of the natural torque profile of the roller shade. The slope is determined using the following formula:

$$k\left(\frac{N\ \text{mm}}{\text{turn}}\right) = \frac{T_{max} - T_{min}}{N_{turns}} \quad (5)$$

where, k is the torque slope of the roller shade, $T_{max}$ is the maximum torque required to lift the shade material 303 and hem bar 304, $T_{min}$ is the minimum torque required to lift the shade material 303 and hem bar 304, and $N_{turns}$ is the number of turns between a rolled up position (FIG. 3B) and a rolled down position (FIG. 3A) of the roller shade.

According to an embodiment, $N_{turns}$ may be determined using the following formula:

$$N_{turns} = \frac{(r_{up} - r_{down})}{t_{material}} \quad (6)$$

where, $r_{down}$ is the radius 308 of the roller tube 301 plus the shade material 303 (if any) at the rolled down position, $r_{up}$ is the radius 311 of the roller tube 301 plus the shade material 303 at the rolled up position, and $t_{material}$ is the thickness of the shade material 303.

Optionally, as discussed above, the $T_{max}$ 202 and $T_{min}$ 203 values of the spring may be offset from the natural torque profile 105 of the roller shade. This can be accomplished through a static offset, as shown by formula 7 below, or a percentage offset, as shown by formula 8 below.

$$T_{min\_offset}(N\ \text{mm}) = T_{min} - \text{offset} \quad (7)$$

$$T_{min\_offset}(N\ \text{mm}) = T_{min} \times (1 - \text{offset}_{percentage}) \quad (8)$$

Once the slope and offset $T_{min}$ 203 value are determined, the number of preset pretension turns can be determined using the following formula:

$$N_{pretension} = \frac{T_{min\_offset}}{k} \quad (9)$$

where, $N_{pretension}$ is the number of pretensioned turns, $T_{min\_offset}$ is the offset minimum torque required of the spring, and k is the torque slope of the roller shade.

If no offset is being made, then $T_{min}$ offset is substituted with $T_{min}$ 103 in the above formula. As shown, the number of pretension turns is determined using the slope of the natural torque profile of the roller shade to bring the minimum torque of the torsion spring up from zero torque to the desired minimum torque value, in this example $T_{min}$ 203. As a result, when the determined preset number of pretension turns are put in the spring, $T_{min}$ 203 of the spring is either substantially equal to $T_{min}$ 103 of the roller shade 300, or as shown in FIG. 2A, it is slightly offset below $T_{min}$ 103 of the roller shade 300 by a predetermined amount. According to an embodiment, the preset number of pretension turns may comprise full 360 degree turns. However, since the pretension is achieved via motor rotation and may be locked via clutch 608 at any orientation, the preset number of pretension turns may include any fraction of 360 degree incremental turns. For example, the preset number of turns could comprise 35.4 turns.

The next section describes an embodiment of a shade drive unit comprising a counterbalancing assembly having a torsion spring that may be pretensioned using the integrated motor of the roller shade and which assists the roller shade to raise and lower the shade during operation. Using the motor, the torsion spring of the counterbalancing assembly can be pretensioned at the factory, or thereafter, to a preset number of turns as required for a particular roller shade to effectively counterbalance the roller shade according to the systems, methods, and modes described above.

Referring to FIG. 4, there is shown a perspective view of a roller shade 400 according to one aspect of the embodiments. Roller shade 400 generally comprises a roller tube 401, a shade drive unit 402, an idler assembly 403, shade material 406, and a hem bar 410. Shade material 410 is connected at its top end to the roller tube 401 and at its bottom end to the hem bar 410. Shade material 406 wraps around the roller tube 401 and is unraveled from the roller tube 401 to cover a window, a door, a wall opening, or any other type of architectural opening. In various embodiments, shade material 406 comprises fabric, plastic, vinyl, or other materials known to those skilled in the art.

Roller tube 401 is generally cylindrical in shape and longitudinally extends from a first end 411*a* to a second end 411*b*. In various embodiments, the roller tube 401 comprises aluminum, stainless steel, plastic, fiberglass, or other materials known to those skilled in the art. The first end 411*a* of the roller tube 401 receives the shade drive unit 402, and the second end 411*b* of the roller tube 401 receives the idler assembly 403.

The idler assembly 403 of the roller shade 100 may comprise an idler pin 409 and an idler body 408 inserted into the second end 411*b* of the roller tube 401. The idler body 408 may be rotatably connected about the idler pin 409. It is inserted into the roller tube 401 and is operably connected to the roller tube 401 such that rotation of the roller tube 401 also rotates the idler body 408. The idler body 408 may comprise a flange 419 to prevent the idler body 408 from sliding entirely into the roller tube 401. The idler body 408 may comprise ball bearings therein (not shown) allowing the idler body 408, and thereby the roller tube 401, rotate with respect to the idler pin 409. The idler pin 409 may include a pin tip 413 disposed on its terminal end to attach the roller shade 400 to a mounting bracket 405*b*.

During installation, the roller shade 400 is mounted on or in a window between the first and second mounting brackets 405*a* and 405*b*. The roller shade 400 may first be mounted to the second mounting bracket 405*b* by inserting the idler pin tip 413 into a keyhole 418 of the second mounting bracket 405*b*. The roller shade 400 may then be mounted to the first mounting bracket 405*a* by snapping the motor head 427 of the shade drive unit 402 to the first mounting bracket 405*a* or coupling the shade drive unit 404 to the first mounting bracket 405*a* using screws. The mounting brackets 405*a* and 405*b* can comprise similar configuration to the CSS-DECOR3 QMT®3 Series Décor Shade Hardware, available from Crestron Electronics, Inc. of Rockleigh, NJ. Other types of brackets may be utilized without departing from the scope of the present embodiments.

The shade drive unit 402 may comprise a motor head 427, a crown adapter wheel 416, a motor housing 407 containing a motor control module 602 and motor 601 (FIG. 6) therein, an idler crown wheel 417, a counterbalancing spring 420, and a drive wheel 421. The shade drive unit 402 may be inserted into the roller tube 401 from the first end 411*a*. The crown adapter wheel 416, idle crown wheel 417, and drive wheel 421 are generally cylindrical in shape and are inserted into and operably connected to roller tube 401 through its first end 411*a*. Crown adapter wheel 416, idle wheel 417, and drive wheel 421 may comprise a plurality of channels 422 extending circumferentially about their external surfaces. Channels 422 mate with complementary projections 424 radially extending from an inner surface 434 of roller tube 401 such that crown adapter wheel 416, idle crown wheel 417, drive wheel 421, and roller tube 401 rotate together during operation. Crown adapter wheel 416 and idler crown wheel 417 can further comprise a plurality of teeth 425 extending circumferentially about their external surfaces to form a friction fit with the inner surface of the roller tube 401. Crown adapter wheel 416 can further comprise a flange 426 radially extending therefrom. Flange 426 prevents the crown adapter wheel 416 from sliding entirely into the roller tube 401, such that the motor head 427 remains exterior to the roller tube 401. The crown adapter wheel 416 removably and releasably couples the shade drive unit 402 to the roller tube 401. The drive wheel 421 is operably connected to the output shaft 605 of the motor 601 as will be later described such that rotation of the motor output shaft 605 also rotates the drive wheel 421. The crown adapter wheel 416 may be rotatably attached to a first end of the motor housing 407 via ball bearings therein (not shown), while the idle wheel 417 may be rotatably attached to a second end of the motor housing 407 via ball bearings 495 (FIG. 9) therein. This ensures that the motor 601 (FIG. 6) is held concentric to the roller tube 401 at the front and the rear of the motor housing 407 by the crown adapter wheel 416 and the idle wheel 417.

In operation, the roller shade 400 is rolled down and rolled up via the shade drive unit 402. Particularly, the motor 601 drives the drive wheel 421, which in turn engages and rotates the roller tube 401. The roller tube 401, in turn, engages and rotates the crown adapter wheel 416, idle crown wheel 417, and idler body 408 with respect to the motor 601, while the motor housing 407, including the motor 601 and motor control module 602, remain stationary. As a result, the shade material 406 may be lowered from an opened or rolled up position, when substantially the entire shade material 406 is wrapped about the roller tube 401, to a closed or rolled down position, when the shade material 406 is substantially unraveled, and vice versa.

FIG. 5 is an illustrative block diagram 500 of the shade drive unit 402 according to one embodiment. The shade drive unit 402 may comprise the motor 601 and a motor control module 602. The motor control module 602 operates to control the motor 601, directing the operation of the motor, including its direction, speed, and position. The motor control module 602 may comprise fully integrated electronics. The motor control module 602 can comprise a controller 504, a memory 506, a communication interface 510, a user interface 509, and a light indicator 507.

Power supply 502 can provide power to the circuitry of the motor control module 602, and in turn the motor 601. Power can be supplied to the motor control module 602 through a power cord 428 (FIG. 4) by connecting a terminal block 432 to a dedicated power supply 502, such as the CSA-PWS40 or CSA-PWS10S-HUB-ENET power supplies, available from Crestron Electronics, Inc. of Rockleigh, NJ. In another embodiment, the shade drive unit 402 may be battery operated and as such may be connected to an internal or external power supply 502 in a form of batteries. In yet another embodiment, the shade drive unit 402 may be powered via solar panels placed in proximity to the window to aggregate solar energy.

Controller 504 can represent one or more microprocessors, and the microprocessors can be "general purpose" microprocessors, a combination of general and special purpose microprocessors, or application specific integrated circuits (ASICs). Controller 504 can provide processing capability to provide processing for one or more of the techniques and functions described herein. Memory 506 can be communicably coupled to controller 504 and can store data and executable code. In another embodiment, memory 506 is integrated into the controller 504. Memory 506 can represent volatile memory such as random-access memory (RAM), but can also include nonvolatile memory, such as read-only memory (ROM) or Flash memory.

Motor control module 602 may further comprise a communication interface 510, such as a wired or a wireless communication interface, configured for receiving control commands from an external control point. The wireless interface may be configured for bidirectional wireless communication with other electronic devices over a wireless network. In various embodiments, the wireless interface 510 can comprise a radio frequency (RF) transceiver, an infrared (IR) transceiver, or other communication technologies known to those skilled in the art. In one embodiment, the wireless interface 510 communicates using the infiNET EX® protocol from Crestron Electronics, Inc. of Rockleigh, NJ. infiNET EX® is an extremely reliable and affordable protocol that employs steadfast two-way RF communications throughout a residential or commercial structure without the need for physical control wiring. infiNET EX® utilizes 16 channels on an embedded 2.4 GHz mesh network topology, allowing each infiNET EX® device to function as an expander, passing command signals through to every other infiNET EX® device within range (approximately 150 feet or 46 meters indoors), ensuring that every command reaches its intended destination without disruption. In another embodiment, communication is employed using the ZigBee® protocol from ZigBee Alliance. In yet another embodiment, wireless communication interface 510 may communicate via Bluetooth transmission.

A wired communication interface 510 may be configured for bidirectional communication with other devices over a wired network. The wired interface 510 can represent, for example, an Ethernet or a Cresnet® port. Cresnet® provides a network wiring solution for Crestron® keypads, lighting controls, thermostats, and other devices. The Cresnet® bus offers wiring and configuration, carrying bidirectional communication and 24 VDC power to each device over a simple 4-conductor cable.

In various aspects of the embodiments, the communication interface 510 and/or power supply 502 can comprise a Power over Ethernet (PoE) interface. The controller 504 can receive both the electric power signal and the control input from a network through the PoE interface. For example, the PoE interface may be connected through category 5 cable (CAT5) to a local area network (LAN) which contains both a power supply and multiple control points and signal generators. Additionally, through the PoE interface, the controller 504 may interface with the internet and receive control inputs remotely, such as from a homeowner running an application on a smart phone.

Motor control module 602 can further comprise a local user interface 509, such as a buttons disposed on the motor head 427 (not shown), that allows users to set up the shade drive unit 402 at the factory, for example to pretension the shade drive unit 402, or after installation in the field, for example to set the shade upper and lower limits. Furthermore, the motor control module 602 may comprise a light indicator 507, such as a multicolor light emitting diode (LED) disposed on the motor head 427 (not shown), for indicating the motor status.

The control commands received by the controller 504 may be a direct user input to the controller 504 from the user interface 509 or a wired or wireless signal from an external control point. For example, the controller 504 may receive a control command from a wall-mounted button panel or a touch-panel in response to a button actuation or similar action by the user. Control commands may also originate from a signal generator such as a timer or a sensor. Accordingly, the motor control module 602 can integrate seamlessly with other control systems using the communication interface 510 to be operated from keypads, wireless remotes, touch screens, and wireless communication devices, such as smart phones. Additionally, the motor control module 602 can be integrated within a large scale building automation system or a small scale home automation system and be controllable by a central control processor, such as the PRO3 control processor available from Crestron Electronics, Inc., that networks, manages, and controls a building management system.

FIGS. 6-9 illustrate various views of the shade drive unit 402 in greater detail. Specifically, FIG. 6 shows a first side perspective view of the shade drive unit 402; FIG. 7 shows a second side perspective view of the shade drive unit 402, FIG. 8 shows an exploded perspective view of a portion of the shade drive unit 402, and FIG. 9 shows a cross-sectional view of a portion of the shade drive unit 402. Referring to FIGS. 6-9, shade drive unit 402 includes a motor housing 407 that houses the motor control module 602 and the motor 601. According to an embodiment, the motor 601 is suspended in the motor housing 407 using a rubber O-ring 603 at the front of the motor 601 and a rubber locking strip 604 at the rear of the motor 601. This allows the motor 601 to be substantially centered within the motor housing 407. The motor 601 may comprise a brushless direct current (BLDC) electric motor. In another embodiment, the motor 601 comprises a brushed direct current (DC) motor, or any other motor known in the art.

The motor 601 drives the drive wheel 421 through a series of drive train components that in combination provide efficiency and counterbalancing to the roller shade, including a first stage planetary gear 606, a clutch 608, and a final stage planetary gear 609, which are described in more detail in U.S. patent application Ser. No. 15/872,467, filed on Jan. 16, 2018, and titled "Motor Pretensioned Rolle Shade", the entire contents of which are hereby incorporated by reference. In one embodiment, the first and final stage planetary gears 606 and 609 may be configured for providing speed reduction and torque increase to achieve efficient operation of the motor 601. According to another embodiment, the first and final stage planetary gears 606 and 609 may be configured for providing increased speed and decreased torque. According to various aspects of the embodiment, the shade drive unit 402 may comprise less, additional, or no planetary gears. In operation, the output shaft 605 of the motor 601 drives into the first stage planetary gear 606, which in turn drives into an input stage of a clutch 608, which drives into an input stage of the final stage planetary gear 609, which drives the output mandrel 610, and which drives the drive wheel 421.

Referring to FIG. 8, the output mandrel 610 extends from a first end connected to the final stage planetary gear 609 within the motor housing 407, out of an opening 615 in the motor housing 407, and to a second end connected to the drive wheel 421. According to one embodiment, output mandrel 610 may comprise a single body. Yet according to another embodiment, the output mandrel 610 may comprise a first mandrel portion 611 and a second mandrel portion 612. The first mandrel portion 611 can comprise a keyed bore 614 while the second mandrel portion 612 can comprise an extrusion with keyed grooves 616 configured to mate with the keyed bore 614 of the first mandrel portion 611. The second mandrel portion 612 can be inserted into the keyed bore 614 of the first mandrel portion 611 and be secured using a retaining clip 617 such that rotation of the first mandrel portion 611 by the motor 601 also rotates the second mandrel portion 612.

The counterbalancing spring 420 longitudinally extends from a first end 423*a* to a second end 423*b*. Spring 420 is mounted about the output mandrel 610, which holds and stabilizes the spring 420 within the roller tube 401, preventing the spring 420 from sagging within the roller tube 401. Motor housing 407 may comprise a first spring carrier 621 configured for engaging and retaining the first end 423*a* of the spring 420. On the opposite end, drive wheel 421 may comprise a second spring carrier 622 configured for engaging and retaining the second end 423*b* of the spring 420. According to one embodiment, each spring carrier 621 and 622 can comprise a cylindrical body comprising threads 623 adapted to retain the coils of the spring. According to an alternate embodiment, the spring 420 may be retained over the spring carriers 621 and 622 using retaining clips in a similar configuration as disclosed in U.S. patent application Ser. No. 16/855,694, filed on Apr. 22, 2020. and titled "Counterbalancing Spring Fasteners", the entire contents of which are hereby incorporated by reference.

The drive wheel 421 comprises a cylindrical body 625 comprising an outer surface 626 that slidably contacts the inner surface 434 of the roller tube 401. The cylindrical body 625 of drive wheel 421 is dimensioned and constructed such that it can longitudinally travel within the roller tube 401 via channels 422 and projections 424 along center axis 604. This translation allows the drive wheel 421 to be displaced longitudinally when the shade drive unit 402 is inserted into the roller tube 401 during installation. The cylindrical body 625 of the drive wheel 421 extends from a first end 627*a* to a second end 627*b*. The second spring carrier 622 extends from the first end 627*a* of the cylindrical body 625. The cylindrical body 625 further comprises a washer receiving cavity 630 recessed into the second end 627*b* of the cylindrical body 625 that is defined by an opening 631 at the second end 627*b* of the cylindrical body 625 and a biasing surface 628 within the cylindrical body 625 of the drive wheel 421. In addition, washer retaining arms 629 circumferentially and inwardly extend from the cylindrical body 625 at the opening 631. The drive wheel 421 may further comprise a keyed bore 632 that traversely extends through the cylindrical body 625 and the second spring carrier 622 of the drive wheel 421. The keyed bore 632 is adapted to slidably retain the second mandrel portion 612 therein. As discussed above, the second mandrel portion 612 can comprise an extrusion with keyed grooves 616 configured to mate with the keyed bore 632 such that rotation of the second mandrel portion 612 also rotates the drive wheel 421. The drive wheel 421 may be attached to the second end of the second mandrel portion 612 using a washer 640 and screw 643. The washer 640 may comprise a hole 641 for receiving the screw 643 and locking arms 642 adapted to engage the retaining arms 629 of the drive wheel 421.

According to an embodiment, shade drive unit 402 can be stocked with only the first mandrel portion 611 extending out of the motor housing 407 through opening 615. After a customer places an order for a customized size roller shade 400, the manufacturing specifications may be determined as discussed above to specify the type of required assembly components, their sizes, as well as the pretension specifications. Using the manufacturing specifications, an appropriate counterbalancing spring 420 is chosen, with specified wire diameter, coil diameter, and length. According to an embodiment, for each roller tube diameter, a factory may maintain an inventory of springs with the same wire diameter and coil diameter. The spring 420 may be cut to a specified length based on the manufacturing specifications. According to another embodiment, the factory may maintain an inventory of springs with lengths at 1 inch or half inch increments that can be chosen for assembly based on the manufacturing specifications. According to an embodiment, for each roller tube diameter with predetermined wire diameter and coil diameter, the following formula may be used to determine the total number of coils of the required spring 420:

$$N_{coils} = N_{fastened} \times 2 + \frac{(d_{wire}/1000)^4 \times (E \times 1000000)}{(C_{friction} \times (d_{coils}/1000) \times (k/1000))} \quad (10)$$

where, $N_{coils}$ is the total number of coils of the required spring, $N_{fastened}$ is the number of nonactive coils at each end of the spring that are attached to the spring carrier 621/622, $d_{wire}$ is the diameter of the spring wire, E is the elastic modulus (MPa), which is the elasticity property of the spring metal, $C_{friction}$ is a constant representing the friction between the spring coils, $d_{coils}$ is the mean diameter of the spring coils, and k is the slope of the torque profile of the roller shade.

Using the total number of coils of the required spring, the total length of the required spring may be determined using the following formula:

$$l_{spring} = N_{coils} \times d_{wire}$$

where, $l_{spring}$ is the total length of the spring, $N_{coils}$ is the total number of coils of the required spring, and $d_{wire}$ is the diameter of the spring wire.

The required spring 420 may be cut in length to the determined total length ($l_{spring}$).

In addition, the manufacturing specifications will also specify the required length of the second mandrel portion 612, which may be cut to size to accommodate the length ($l_{spring}$) of the required spring 420. According to the present embodiments, the ends 423*a* and 423*b* of the spring 420 are fixidly mounted to the shade drive unit 402 such that the spring 420 is maintained at a constant length and cannot translate in length. The second mandrel portion 612 comprises a length such that the spring 420 is maintained in a stretched out state. Stretching out the spring 420 prevents the individual spring coils from touching each other and therefore reducing friction created by the spring 420 as it is being tensioned. Furthermore, according to the present embodiment, the determined length of the second mandrel portion 612 accounts for the deflection of the spring 420 when it is pretensioned as well as when it is further tensioned during the operation of the roller shade 400. Specifically, as the spring 420 is tensioned during its pretensioning at the factory and further during operation when the roller shade 400 rolls down to the rolled down position, the coils of the spring 420 will become tighter causing the space between the coils to become smaller. As such, the construction of the motor drive unit 402 of the present embodiments stretches out the spring 420 and maintains it in a stretched out state such that its individual coils do not contact when the spring 420 is fully tensioned when the roller shade 400 is at the rolled down position. To account for the maximum tensioning of the spring 420, the following formula may be used to determine the length of the spring 420 at a maximum tension—i.e., as the spring would be at the rolled down position of the roller shade 400:

$$l_{deflected}=d_{wire}((N_{coils}-N_{fastened}\times 2)+N_{turns}+N_{pretension}+1) \quad (12)$$

where, $l_{deflected}$ is the deflected length of the active portion of the spring 420 at maximum tension, $d_{wire}$ is the diameter of the spring wire, $N_{coils}$ is the total number of coils of the required spring, $N_{fastened}$ is the number of nonactive coils at each end of the spring that are fastened to a spring carrier 621/622, $N_{turns}$ is the number of turns between a rolled up position and a rolled down position of the roller shade, and $N_{pretension}$ is the number of pretensioned turns.

The length of the second mandrel portion 612 is determined to ensure that the spring 420 is maintained at a stretched out state between the terminal ends of first mandrel portion 621 and the second mandrel portion 621 when the roller shade 400 is at the rolled down position. As such, the length of the second mandrel portion 612 accounts for the deflection of the spring 420 at the rolled down position as well as the assembly factors, and may be determined using the following formula:

$$l_{mandrel}=l_{deflected}+l_{clearance}+l_{components} \quad (13)$$

where, $l_{mandrel}$ is the length the second mandrel portion 612, $l_{deflected}$ is the deflected length of the active portion of the spring 420 at maximum tension, $l_{clearance}$ is a clearance factor that is added to ensure that the spring coils do not touch when the spring 420 is fully tensioned at the rolled down position, and $l_{components}$ is an adjustment factor to account for the assembly components of the shade drive unit assembly.

Particularly, the adjustment length factor $l_{components}$ accounts for the additional length required for the second mandrel portion 612 to be fastened into the first mandrel portion 621 and into the second mandrel portion 622, minus the length of the first mandrel portion 611 that extends out of the first spring carrier 621. The second mandrel portion 612 may then be cut to the determined length specification ($l_{mandrel}$).

Referring to FIG. 8, during assembly of the roller shade 400 to customer specifications, the cut second mandrel portion 612 is inserted into the keyed bore 614 of the first mandrel portion 611 and secured using the retaining clip 617. Then, the spring 420 is slipped over the second mandrel portion 612 and the first end 423*a* of the spring 420 is concentrically mounted about the first spring carrier 621 by twisting the spring coils onto threads 623 of the first spring carrier 621. The drive wheel 421 is then mounted over the second mandrel portion 612 by inserting the terminal end of the second mandrel portion 612 through bore 632 in the drive wheel 421 until the second end 423*b* of the spring 420 can be concentrically mounted about the second spring carrier 622 by twisting the spring coils onto threads 623 on the second spring carrier 622. After attaching the spring 420 to the second spring carrier 622, the drive wheel 421 is pulled to pull the second end 423*b* of the spring 420 away from the first end 421*a* of the spring 420 and stretch out the spring 420 until the terminal end of the second mandrel portion 612 is fully inside bore 632 and does not extend out of the bore 632 of the drive wheel 421. Washer 640 may then be inserted through opening 631 in the second end 627*b* of the cylindrical body 625 of the drive wheel 421 by aligning the locking arms 642 of the washer 640 with the space between any two retaining arms 629 of the cylindrical body 625 of the drive wheel 421. The washer 640 may then be inserted into the washer receiving cavity 630 and biased against the washer biasing surface 628 and turned until the locking arms 642 of the washer 640 engage the retaining arms 629 of the drive wheel 421. The washer 640 may then be secured to the drive wheel 421 by inserting the screw 643 through the hole 641 in the washer 640 and screwing it into a threaded hole 645 in the terminal end of the second mandrel portion 612. The washer 640 secures the drive wheel 421 to the terminal end of the second mandrel portion 612 such that the spring 420 is maintained in a stretched state to add separation between the spring coils and thereby eliminate any friction between the coils. As previously discussed, the spring 420 is stretched to a length that mains a distance 633 between the spring coils even when the roller shade 400 is at a rolled down position by accounting for the tensioning and resulting deflection of the spring 420 at the rolled down position.

Using the above discussed assembly, the roller shade 400 may then be pretensioned by the above determined pretension turns ($N_{pretension}$) in either a clockwise or counterclockwise direction, depending in which direction the shade drive unit 402 needs to turn to unravel the shade material 406 from the roller tube 401 and the direction of the spring coils. For example, if the roller shade 400 is configured to lift the shade material 406 from a closed position to an opened position in a counterclockwise direction, the spring 420 should be pretensioned in a clockwise direction. On the other hand, if the roller shade 400 is configured to lift the shade material 406 from a closed position to an opened position in a clockwise direction, the spring 420 should be pretensioned in a counterclockwise direction.

To pretension the roller shade 400, the shade drive unit 402 may enter into a pretensioning mode to pretension the spring 420 according to the predetermined number of pretension turns, for example in a counterclockwise direction. For example, the pretensioning mode may be initiated by pressing a button or a combination of buttons using the user interface 509. According to an embodiment, the motor controller 504 may indicate that it is in the pretensioning mode by blinking the light indicator 507 red. The determined number of pretension turns may be communicated to the motor controller 504 in a variety of ways. According to an embodiment, a technician may connect the shade drive unit 402 to a programming computer or tool (not shown) via the communication interface 510 and enter shade parameters and spring parameters into the programming computer. The programming computer may calculate the preset number of pretension turns and communicate that information to the motor controller 504. According to another embodiment, the technician may enter the preset number of pretension turns via the user interface 509. The motor controller 504 may store the predetermined number of pretension turns in memory 506.

The shade drive unit 402 is pretensioned while it is located outside the roller tube 401, such that rotation of the drive wheel 421 is located outside the roller tube 401 and is not hindered by any object. According to an embodiment, the shade drive unit 402 may be placed on a rack that holds the motor housing 407 still, but which does not contact the drive wheel 421. According to another embodiment, the technician may hold the motor housing 407, without contacting the drive wheel 421, during pretensioning.

The motor controller 504 will then signal the motor 601 to rotate the motor output shaft 605 a predetermined number of turns in the counterclockwise direction while the motor housing 407 is held stationary. Because the shade drive unit 402 may comprise a plurality of planetary gear assemblies 606 and 609, the actual number of revolutions that the motor output shaft 605 needs to turn to achieve the predetermined number of pretension turns at the spring 420 may be adjusted by a predetermined ratio depending on the configuration of the planetary gear assemblies 606 and 609. As discussed above, the motor output shaft 605 will drive the output mandrel 610 and drive wheel 421 through the first stage planetary gear 606, clutch 608, and final stage planetary gear 609. As the drive wheel 421 rotates in the counterclockwise direction, the second spring carrier 622 also rotates in a counterclockwise direction, while the first spring carrier 621 and motor housing 407 remain stationary. This results in pretensioning the counterbalancing spring 420 as its second end **423*b*, connected to the second spring carrier 622, rotates in a counterclockwise direction with respect to its first end 423*a*, connected to the first spring carrier 621. Pretensioning turns are then applied by continual rotation of the drive wheel 421 with respect to the motor housing 407** until the predetermined number of pretensioning turns is reached.

After the desired number of pretensioning turns is reached, the motor 601 may stop and the motor controller 504 may exit the pretensioning mode, stop blinking the light indicator 507 red, and turn the light indicator 507 green to indicate that the pretensioning mode is complete. The clutch of the drive train prevents any rotational motion back from the drive wheel 421 such that clutch can lock the pretension in the spring 420. The technician may then complete assembling the roller shade 400 by inserting the pretensioned shade drive unit 402 into the roller tube 401 and packaging the roller shade 400. After its assembly, the roller shade 400 is shipped out to the customer to be installed in a window.

After installation and during operation, to roll down the roller shade 400, the motor 601 rotates the drive wheel 421 and thereby the second spring carrier 622 and roller tube 401 in a first direction, while the motor housing 407 and thereby the first spring carrier 621 remain stationary. Rotation of the motor 601, as well as the increasing weight of the shade material 406 and the hem bar 410, cause the counterbalancing spring 420 to progressively build torque. The pretensioning ensures that the rolling down cycle of the roller shade 400 starts at the desired $T_{min}$ value 203, as discussed above with reference to FIG. 2A. As the roller shade 400 rolls down, counterbalancing spring 420 continues to build torque in substantially a linear fashion (traveling left along the x-axis in the diagram of FIG. 2A) until the $T_{max}$ value 202 is reached. As the roller shade 400 rolls down, the shade material 406 gradually unravels and progressively more shade material 409 hangs down from the roller tube 401. The increasing weight of the shade material 406 and the hem bar 410 assist the motor 601 to build torque in the counterbalancing spring 420 throughout the rolling down cycle without the motor 601 requiring to exert much power, as shown by the exerted motor torque 208 and power 210. In addition, as the spring 420 continuously builds torque, it is tensioned causing its coils to tighten and come closer to each other until the roller shade 400 reaches the rolled down position. However, because the spring 420 was stretched over the output mandrel 610 to a length that accounted the length of the spring deflection plus a clearance factor, at the fully tensioned state the spring coils do not touch or rub and do not add any friction to the shade drive unit 402.

When rolling up the shade 400, the torque that was built up in the counterbalancing spring 420 during the rolling down cycle assists the motor 601 to roll up the shade 400 during the entire rolling up cycle (traveling right along the x-axis in the diagram of FIG. 2A). As the roller shade 400 rolls up, counterbalancing spring 420 releases torque in a substantially linear fashion until the $T_{min}$ value 203 is reached. The decreasing weight of the shade material 406 and the hem bar 410 combined with the progressively released torque by the spring 420 effectively assist the motor 601 to roll up the shade material 460 throughout the rolling up cycle without the motor 601 requiring to exert much power, as shown by the exerted motor torque 208 and power 210. Spring 420 assists the motor 601 to finish rolling up the shade material 406 all the way through the end of the rolling up cycle because the torque of the counterbalancing spring 420 does not return to zero, but returns to the $T_{min}$ value 203 as a result of the pretension.

At the end of each rolling up cycle, the pretension put into the spring 420 continues to be locked by the clutch 608. The pretension continues to be locked even if the roller shade 400 is knocked down or hit accidentally, or when the shade needs to be removed and reinstalled. Beneficially, the roller shade 400 may be easily serviced by a field technician or repaired as the roller shade may be easily disassembled and the factory specified pretension turns may be put back into the spring 420. In addition, if a defective motor needs to be replaced, the customized pretensioning information of the defective motor stored in memory 506 may be transferred to and used by the replacement motor to pretension its spring.

According to further aspects of the embodiments, pretensioning of the roller shade 400 can be accomplished in a clockwise direction in a substantially similar manner as discussed above, but with rotation of the motor output shaft 605, and thereby drive wheel 421, in a clockwise direction with respect to the motor housing 407. According to an embodiment, a different torsion spring may be used with coils winding in a clockwise direction. Pretension of the roller shade 400 may then be locked in a clockwise direction and the roller shade 400 can rotate in a clockwise direction to roll down the shade material 406, and in counterclockwise direction to roll up the shade material 406 in substantially the same way as discussed above.

INDUSTRIAL APPLICABILITY

To solve the aforementioned problems, the aspects of the embodiments are directed toward systems, methods, and modes for counterbalancing and pretensioning a roller shade via a motor to lower the torque load on the motor of the roller shade throughout the rolling up or rolling down cycles. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments. The embodiments described herein may be used for covering windows as well as doors, wall openings, or the like. The embodiments described herein may further be adapted in other types of window or door coverings, such as inverted rollers, Roman shades, Austrian shades, pleated shades, blinds, shutters, skylight shades, garage doors, or the like.

Moreover, the processes described herein are not meant to limit the aspects of the embodiments, or to suggest that the aspects of the embodiments should be implemented following these processes. The purpose of the aforementioned processes is to facilitate the understanding of one or more aspects of the embodiments and to provide the reader with one or many possible implementations of the processes discussed herein. The steps performed during the aforementioned process are not intended to completely describe the processes but only to illustrate some of the aspects discussed above. It should be understood by one of ordinary skill in the art that the steps may be performed in a different order and that some steps may be eliminated or substituted.

The invention claimed is:

1. A roller shade comprising:

a roller tube;

a shade material attached to the roller tube; and a shade drive unit at least partially disposed within the roller tube and comprising a drive assembly that rotates the roller tube to lower or raise the shade material between a rolled up position and a rolled down position, wherein the shade drive unit comprises:

a stationary spring carrier;

a rotating spring carrier operably connected to the roller tube and comprising a bore that traversely extends therethrough and a washer receiving cavity recessed into a terminal end of the rotating spring carrier and comprising washer retaining arms inwardly extending within the washer receiving cavity;

a counterbalancing spring connected to and longitudinally extending between the stationary spring carrier and the rotating spring carrier, wherein the spring comprises an active portion having a plurality of coils located between the stationary spring carrier and the rotating spring carrier;

an output mandrel comprising a first end operably connected to the drive assembly and a second terminal end that extends through the bore of the rotating spring carrier, wherein the output mandrel extends within the entire active portion of the spring between the stationary spring carrier and the rotating spring carrier, wherein during operation the drive assembly rotates the output mandrel and the rotating spring carrier with respect to the stationary spring carrier; and a locking washer comprising locking arms outwardly extending therefrom, wherein the locking washer is inserted into the washer receiving cavity by aligning the locking arms with spaces between the washer retaining arms and rotating the washer until the locking arms are aligned with and below the washier retaining arms thereby longitudinally retaining the washer within the washer receiving cavity;

wherein the output mandrel comprises a determined length and the washer is biased against the second terminal end of the output mandrel thereby offsetting the stationary spring carrier from the rotating spring carrier to maintain the spring in a stretched state such that the plurality of coils at the active portion of the spring do not contact each other when the shade material is at the rolled down position.

2. The roller shade of claim 1, wherein at the rolled down position the spring is at a maximum tension, and wherein the determined length of the output mandrel between the stationary spring carrier and the rotating spring carrier equals to or is larger than a deflected length of the active portion of the spring at the maximum tension.

3. The roller shade of claim 1, wherein the determined length of the output mandrel is a factor of a diameter of a wire of the spring, a number of coils at the active portion of the spring, and a number of turns between the rolled up position and the rolled down position.

4. The roller shade of claim 1, wherein the determined length of the output mandrel is determined using the following formula:

$$l_{mandrel}=l_{deflected}+l_{clearance}+l_{components}$$

where, $l_{mandrel}$ is the determined length the output mandrel, $l_{deflected}$ is a deflected length of the active portion of the spring at a maximum tension, $l_{clearance}$ is a predetermined clearance factor, and $l_{components}$ is an adjustment factor that accounts for assembly of the shade drive unit.

5. The roller shade of claim 4, wherein the deflected length of the active portion of the spring at the maximum tension is determined using the following formula:

$$l_{deflected}=d_{wire}((N_{coils}-N_{fastened}\times 2)+N_{turns}+1)$$

where, $d_{wire}$ is a diameter of a wire of the spring, $N_{coils}$ is a total number of coils of the spring, $N_{fastened}$ is a number of coils at each end of the spring that are attached to one of the stationary and the rotating spring carriers, $N_{turns}$ is a number of turns between the rolled up position and the rolled down position.

6. The roller shade of claim 1, wherein the spring is pretensioned when the shade material is at the rolled up position, and wherein the determined length of the output mandrel between the stationary spring carrier and the rotating spring carrier is a factor of a number of pretension turns in the spring at the rolled up position such that the plurality of coils at the active portion of the spring do not contact each other when the shade material is at the rolled down position.

7. The roller shade of claim 4, wherein the spring is pretensioned when the shade material is at the rolled up position, and wherein the deflected length of the active portion of the spring at the maximum tension is determined using the following formula:

$$l_{deflected}=d_{wire}((N_{coils}-N_{fastened}\times 2)+N_{turns}+N_{pretension}+1)$$

where, $d_{wire}$ is a diameter of a wire of the spring, $N_{coils}$ is a total number of coils of the spring, $N_{fastened}$ is a number of coils at each end of the spring that are attached to one of the stationary and the rotating spring carriers, $N_{turns}$ is a number of turns between the rolled up position and the rolled down position, and $N_{pretension}$ is a number of pretensioned turns in the spring at the rolled up position.

8. The roller shade of claim 1, wherein the drive assembly comprises a motor that drives a motor output shaft operably connected to the output mandrel.

9. The roller shade of claim 8, wherein the shade drive unit comprises a motor housing that houses the motor therein and comprises the stationary spring carrier, wherein the output mandrel extends from an opening in the motor housing, and wherein during operation of the motor rotation of the motor output shaft causes rotation of the rotating spring carrier and thereby the roller tube while the motor housing and the motor remain stationary.

10. The roller shade of claim 8, wherein the drive assembly further comprises at least one selected from the group consisting of a planetary gear, a clutch, or any combinations thereof.

11. The roller shade of claim 1, wherein the output mandrel comprises a first mandrel portion connected to a second mandrel portion, wherein the first mandrel portion is operably connected to the drive assembly and wherein the second mandrel portion is attached to the rotating spring carrier.

12. The roller shade of claim 1, wherein during assembly of the shade drive unit:

the spring is positioned over the output mandrel and attached at a first end of the spring to the stationary spring carrier, the rotating spring carrier is slidably mounted over the output mandrel and attached to a second end of the spring while the spring is in an unstretched state, and the rotating spring carrier is slidably pulled away from the stationary spring carrier to stretch the spring to the stretched state and attached to the second terminal end of the output mandrel.

13. The roller shade of claim 1, wherein the rotating spring carrier comprises a drive wheel operably connected to the roller tube.

14. The roller shade of claim 13, wherein the bore is shaped to mate with an external surface of the output mandrel such that rotation of the output mandrel causes rotation of the drive wheel.

15. The roller shade of claim 1, wherein the washer is further secured to the output mandrel via a screw inserted through a hole in the washer and screwed into a threaded hole in the second terminal end of the output mandrel.

16. A roller shade comprising:

a roller tube;

a shade material attached to the roller tube; and a shade drive unit at least partially disposed within the roller tube to rotate the roller tube to lower or raise the shade material from a rolled up position to a rolled down position, wherein the shade drive unit comprises:

a motor that drives a motor output shaft;

a motor housing that houses the motor therein and comprising a first spring carrier;

an output mandrel comprising a first end operably connected to the motor output shaft and a second terminal end that extends out of an opening in the motor housing;

a drive wheel comprising:

a bore that traversely extends therethrough and through which the second terminal end of the output mandrel extends, a second spring carrier, and a washer receiving cavity recessed into a terminal end of the drive wheel and comprising washer retaining arms inwardly extending within the washer receiving cavity, wherein the drive wheel is operably connected to the roller tube;

a locking washer comprising locking arms outwardly extending therefrom, wherein the locking washer is inserted into the washer receiving cavity by aligning the locking arms with spaces between the washer retaining arms and rotating the washer until the locking arms are aligned with and below the washier retaining arms thereby longitudinally retaining the washer within the washer receiving cavity; and a counterbalancing spring longitudinally extending from a first end to a second end and comprising a plurality of coils, wherein the first end of the counterbalancing spring is connected to the first spring carrier and the second end of the counterbalancing spring is connected to the second spring carrier, wherein the output mandrel extends within the counterbalancing spring;

wherein the output mandrel comprises a determined length and the washer is biased against the second terminal end of the output mandrel thereby maintaining the spring in a stretched state such that the plurality of coils of the spring located between the first and second spring carriers do not touch when the shade material is at the rolled down position.

17. A roller shade comprising:

a roller tube;

a shade material attached to the roller tube; and a shade drive unit at least partially disposed within the roller tube and comprising a drive assembly that rotates the roller tube to lower or raise the shade material between a rolled up position and a rolled down position, wherein the shade drive unit comprises:

a stationary spring carrier;

a rotating spring carrier operably connected to the roller tube and comprising a bore that traversely extends therethrough and a washer receiving cavity recessed into a terminal end of the rotating spring carrier and comprising washer retaining arms inwardly extending within the washer receiving cavity;

a counterbalancing spring connected to and longitudinally extending between the stationary spring carrier and the rotating spring carrier, wherein the spring comprises an active portion having a plurality of coils located between the stationary spring carrier and the rotating spring carrier, wherein the spring is pretensioned when the shade material is at the rolled up position;

an output mandrel comprising a first end operably connected to the drive assembly and a second terminal end that extends through the bore of the rotating spring carrier, wherein the output mandrel extends within the entire active portion of the spring between the stationary spring carrier and the rotating spring carrier; and a locking washer comprising locking arms outwardly extending therefrom, wherein the locking washer is inserted into the washer receiving cavity by aligning the locking arms with spaces between the washer retaining arms and rotating the washer until the locking arms are aligned with and below the washer retaining arms thereby longitudinally retaining the washer within the washer receiving cavity;

wherein the output mandrel comprises a determined length and the washer is biased against the second terminal end of the output mandrel thereby offsetting the stationary spring carrier from the rotating spring carrier to maintain the spring in a stretched state, wherein the determined length of the output mandrel is a factor of a number of pretension turns in the spring at the roller up position such that the plurality of coils at the active portion of the spring do not contact each other when the shade material is at the rolled down position.

* * * * *